United States Patent
Adema et al.

(10) Patent No.: US 12,292,569 B2
(45) Date of Patent: May 6, 2025

(54) BEAM COMBINING ARCHITECTURES FOR SCANNING DISPLAY SYSTEMS

(71) Applicant: GOOGLE LLC, Mountain View, CA (US)

(72) Inventors: Daniel Adema, Kitchener (CA); Stuart James Myron Nicholson, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 590 days.

(21) Appl. No.: 17/580,745

(22) Filed: Jan. 21, 2022

(65) Prior Publication Data
US 2022/0269083 A1 Aug. 25, 2022

Related U.S. Application Data

(60) Provisional application No. 63/140,321, filed on Jan. 22, 2021.

(51) Int. Cl.
*G03B 21/20* (2006.01)
*G02B 27/01* (2006.01)
(Continued)

(52) U.S. Cl.
CPC ....... *G02B 27/0172* (2013.01); *G02B 27/141* (2013.01); *G02B 27/283* (2013.01);
(Continued)

(58) Field of Classification Search
CPC ............ G03B 21/2033; G03B 21/2013; G02B 27/0172; G02B 27/141; G02B 27/017; H04N 9/3161; H04N 9/3164
See application file for complete search history.

(56) References Cited

U.S. PATENT DOCUMENTS 6,529,325 B1   3/2003 Kokkelink et al.
2003/0197870 A1   10/2003 Bagwell et al.
(Continued)

OTHER PUBLICATIONS

'Laser Combiner a Compact Solution for Wearable Displays', https://www.photonics.com/Articles/Laser_Combiner_a_Compact_Solution_for_Wearable/a56813, Photonics Spectra, Jan. 2015, 2 pages.
(Continued)

*Primary Examiner* — Ryan D Howard

(57) ABSTRACT

Systems, devices, and methods for accommodating multiple sets of laser light sources in an optical engine of a display system such as a laser projection system are described. Laser light beams may be combined via wavelength-, polarization-, and/or angular-separation-based techniques. First and second sets of laser light beams may be angularly separated such that different sets of partially overlapping pixels are projected by the system, thereby increasing the display pixel density and/or an expanding the field of view of the display. One or more laser die may be mounted to each submount of the optical engine. For embodiments with two laser dies on each submount, collimating lenses may introduce angular separation between laser light beams output by each pair of commonly mounted laser dies. A retroreflector prism may be disposed at a beam combiner to provide a compact extension of the optical path through the beam combiner.

20 Claims, 21 Drawing Sheets

(51) Int. Cl.
*G02B 27/14* (2006.01)
*G02B 27/28* (2006.01)

(52) U.S. Cl.
CPC ............... *G02B 2027/0114* (2013.01); *G02B 2027/0178* (2013.01)

(56) References Cited

U.S. PATENT DOCUMENTS

| | | |
|---|---|---|
| 2010/0302513 A1 | 12/2010 | Takahashi et al. |
| 2011/0228249 A1 | 9/2011 | Koehler et al. |
| 2014/0291496 A1 | 10/2014 | Shpunt et al. |
| 2016/0161752 A1 | 6/2016 | Negoita et al. |
| 2017/0115554 A1* | 4/2017 | D'Oosterlinck ... G03B 21/2066 |
| 2017/0285936 A1 | 10/2017 | Hirshberg et al. |
| 2017/0299956 A1* | 10/2017 | Holland ................ G02B 27/14 |
| 2018/0239148 A1 | 8/2018 | Rudy et al. |
| 2019/0219815 A1 | 7/2019 | Price et al. |
| 2022/0269083 A1* | 8/2022 | Adema ................ G02B 27/141 |

OTHER PUBLICATIONS

Clarke 'Techniques for Laser Combining', https://webcache.googleusercontent.com/search?q=cache:b5EGpFrwfjIJ:https://lumoptica.com/file_download/6/Laser%2Bbeam%2BCombining.pdf+&cd=1&hl=en&ct=clnk&gl=in, LumOptica Innovation in Light, 2015, 13 pages.

* cited by examiner

BEAM COMBINING ARCHITECTURES FOR SCANNING DISPLAY SYSTEMS

BACKGROUND

Scanning display systems, such as scanning laser projection systems, conventionally use a single set of semiconductor laser light sources to generate the laser light that is projected by the system to display images. Such a set of semiconductor laser light sources typically includes one each of a red laser light source, a green laser light source, and a blue laser light source. However, commercially available semiconductor laser light sources with sufficient illumination power for the requirements of a typical scanning display system have relatively high threshold excitation levels, meaning that electrical power fed into such a semiconductor laser below its threshold excitation level does not generate usable light for the display system, resulting in wasted energy. Additionally, commercially available lasers with relatively low threshold excitation levels do not have sufficient illumination power to meet the requirements of a typical scanning display system. The loss of energy due to below-threshold excitation of the semiconductor lasers reduces the available duty-cycle of display systems with fixed battery capacity.

Due to these limitations, typical semiconductor laser light sources generally operate above their threshold excitation level to achieve lasing. However, this limits the ability of the semiconductor laser light sources to operate at the dimmer end of their dynamic range. That is, requiring a typical semiconductor laser light source to operate above its threshold excitation level results in the semiconductor laser light source being unable to produce stable amounts of laser light at a low intensity.

BRIEF SUMMARY OF EXAMPLE EMBODIMENTS

In certain embodiments, a display system comprises an optical engine that includes a first set of laser light sources that includes at least three laser light sources, and a second set of laser light sources that includes at least one laser light source; and a beam combiner configured to combine a plurality of laser light beams output by the first set of laser light sources and the second set of laser light sources.

The laser light sources of the first set of laser light sources may have a first threshold excitation level, and the laser light sources of the second set of laser light sources may have a second threshold excitation level. The first set of laser light sources may output laser light beams having a first intensity and a first set of wavelengths, such that the second set of laser light sources output second laser light beams having a second intensity and a second set of wavelengths that is substantially identical to the first set of wavelengths. The first threshold excitation level may be higher than the second threshold excitation level, and the first intensity may be higher than the second intensity.

The first set of laser light sources may output laser light beams having a first set of wavelengths, and the second set of laser light sources may output second laser light beams having a second set of wavelengths that is different from the first set of wavelengths. The first set of wavelengths may include first red, green, and blue (R1G1B1) nominal wavelengths, and the second set of wavelengths may include second red, green, and blue (R2G2B2) nominal wavelengths that are different than the R1G1B1 nominal wavelengths. The first set of wavelengths may include red, green, and blue (RGB) nominal wavelengths, and the second set of wavelengths may include cyan, yellow, and maroon (CYM) nominal wavelengths.

The first set of laser light sources may include a first type of laser light source, and the second set of laser light sources may include a second type of laser light source different from the first type of laser light source. The first type of laser light source may be selected from a group that includes double heterojunction laser diodes, quantum dot lasers, vertical-cavity surface-emitting lasers (VCSELs), internal cavity lasers, and external cavity lasers.

The second set of laser light sources may include multiple laser light sources, and the beam combiner may include a first set of dichroic beam splitters configured to combine a first subset of the plurality of laser light beams output by the first set of laser light sources into a first combined laser light beam, and a second set of dichroic beam splitters configured to combine a second subset of the plurality of laser light beams output by the second set of laser light sources into a second combined laser light beam.

The first combined laser light beam may be angularly separated from the second combined laser light beam. The display system may further include a waveguide having an incoupler, the waveguide configured to project the first combined laser light beam and the second combined laser light beam; and an optical scanner configured to receive the first combined laser light beam and the second combined laser light beam and to scan the first combined laser light beam and the second combined laser light beam along the incoupler to form respective first and second sets of pixels.

The at least one laser light source of the second set of laser light sources may include multiple laser light sources. The optical engine may further include a plurality of submounts, such that each of a plurality of pairs of laser light sources of the first and second sets of laser light sources may be disposed on a respectively different submount of the plurality of submounts. Each laser light source of the first and second sets of laser light sources may comprise a laser die. The display system may further include a plurality of collimating lenses disposed between the optical engine and the beam combiner, such that the collimating lenses are configured to angularly separate pairs of laser light beams of the plurality of laser light beams, each of the pairs of laser light beams corresponding to a different pair of the plurality of pairs of laser light sources.

At least one of the laser light sources may output a laser light beam having a noncircular profile.

In certain embodiments, an optical engine may include a first set of laser light sources having at least three laser light sources, and a second set of laser light sources that includes at least one laser light source. The laser light sources of the first set of laser light sources may have a first threshold excitation level, and the laser light sources of the second set of laser light sources may have a second threshold excitation level. The first set of laser light sources may output laser light beams having a first intensity and a first set of wavelengths, such that the second set of laser light sources output second laser light beams having a second intensity and a second set of wavelengths that is substantially identical to the first set of wavelengths. The first threshold excitation level may be higher than the second threshold excitation level, and the first intensity may be higher than the second intensity.

The first set of laser light sources may output laser light beams having a first set of wavelengths, such that the second set of laser light sources output second laser light beams having a second set of wavelengths that is different from the first set of wavelengths. The first set of wavelengths may include first red, green, and blue (R1G1B1) nominal wavelengths, and the second set of wavelengths may include second red, green, and blue (R2G2B2) nominal wavelengths that are different than the R1G1B1 nominal wavelengths. The first set of wavelengths may include red, green, and blue (RGB) nominal wavelengths, and the second set of wavelengths may include cyan, yellow, and maroon (CYM) nominal wavelengths.

The first set of laser light sources may include a first type of laser light source, and the second set of laser light sources may include a distinct second type of laser light source.

In some embodiments, a wearable heads-up display (WHUD) may include a first set of laser light sources that includes at least three laser light sources, a second set of laser light sources that includes at least one laser light source, and a beam combiner configured to combine a plurality of laser light beams output by the first set of laser light sources and the second set of laser light sources.

The second set of laser light sources may include multiple laser light sources, such that the beam combiner includes a plurality of dichroic beam splitters configured to combine a first subset of the plurality of laser light beams output by the first set of laser light sources into a first combined laser light beam and to combine a second subset of the plurality of laser light beams output by the second set of laser light sources into a second combined laser light beam. The first combined laser light beam may be angularly separated from the second combined laser light beam. The WHUD may further include an optical scanner configured to scan the first combined laser light beam and the second combined laser light beam along an incoupler of a waveguide, such as to form respective first and second sets of pixels based at least in part on an angular separation of the first combined laser light beam and the second combined laser light beam.

The at least one laser light source of the second set of laser light sources may include multiple laser light sources, such that the optical engine further comprises a plurality of submounts, and that each of a plurality of pairs of laser light sources of the first and second sets of laser light sources may be disposed on a respectively different submount of the plurality of submounts.

In certain embodiments, a display system may include an optical engine having a plurality of laser light sources, and a beam combiner configured to combine a plurality of laser light beams output by the plurality of laser light sources.

The beam combiner may include a plurality of dichroic beam splitters that each receive one or more laser light beams of the plurality of laser light beams. The plurality of dichroic beam splitters may be arranged within the beam combiner in an ascending order with respect to a wavelength of light respectively associated with each of the plurality of dichroic beam splitters.

The beam combiner may include at least one polarization beam splitter configured to combine a first subset of the plurality of laser light beams having a first polarization with a second subset of the plurality of laser light beams having a second polarization.

The beam combiner may be configured to combine a first subset of the plurality of laser light beams into a first combined laser light beam, and to combine a second subset of the plurality of laser light beams into a second combined laser light beam that is distinct and separate from the first combined laser light beam. The beam combiner may include a first set of dichroic beam splitters to combine the first subset of laser light beams and may include a second set of dichroic beam splitters to combine the second subset of laser light beams. The first combined laser light beam may be angularly separated with respect to the second combined laser light beam. The display system may further include a waveguide having an incoupler and configured to project the first combined laser light beam and the second combined laser light beam; and an optical scanner configured to receive the first combined laser light beam and the second combined laser light beam and to scan the first combined laser light beam and the second combined laser light beam via the incoupler, such as to form respective first and second sets of pixels. The first set of pixels may at least partially overlap the second set of pixels within a field of view of the display system. A first region of the field of view may include only pixels of the first set of pixels, and a second region of the field of view may include only pixels of the second set of pixels. A third region of the field of view may include pixels of the first set of pixels superimposed with at least some of the second set of pixels.

The display system may further include a plurality of collimating lenses that are disposed between the optical engine and the beam combiner, and that are configured to angularly separate pairs of laser light beams of the plurality of laser light beams. The display system may still further include a retroreflector prism disposed at a first side of the beam combiner, such that the optical engine and the collimating lenses are disposed at a second side of the beam combiner that is opposite the first side. The retroreflector prism may be configured to provide an extended optical path length to one or more laser light beams of the plurality of laser light beams. The display system may further include a wedge prism coupled to the beam combiner to adjust an angular separation between the laser light beams of each pair of laser light beams output by the beam combiner toward the retroreflector prism.

In certain embodiments a beam combiner, operable to be optically coupled to a plurality of laser light sources, may include a plurality of dichroic beam splitters configured to combine a first subset of the plurality of laser light beams into a first combined laser light beam, and to combine a second subset of the plurality of laser light beams into a second combined laser light beam that is distinct and separate from the first combined laser light beam.

The plurality of dichroic beam splitters may be arranged within the beam combiner in an ascending order with respect to a wavelength of light respectively associated with each of the plurality of dichroic beam splitters.

The beam combiner may include at least one polarization beam splitter configured to combine a first subset of the plurality of laser light beams having a first polarization with a second subset of the plurality of laser light beams having a second polarization.

The beam combiner may include a first set of dichroic beam splitters to combine the first subset of laser light beams, and a second set of dichroic beam splitters to combine the second subset of laser light beams.

The first combined laser light beam may be angularly separated with respect to the second laser light beam.

The beam combiner may include a retroreflector prism configured to provide an extended optical path length to one or more laser light beams of the plurality of laser light beams. The beam combiner may further include a wedge prism configured to adjust an angular separation between the laser light beams of each of multiple pairs of laser light beams output by the beam combiner toward the retroreflector prism.

In certain embodiments, a method may include combining a first subset of a plurality of laser light beams into a first combined laser light beam; combining a second subset of the plurality of laser light beams into a second combined laser light beam that is angularly separated from the first combined laser light beam; and, based at least in part on an angular separation of the first combined laser light beam and the second combined laser light beam, scanning the first combined laser light beam and the second combined laser light beam across an incoupler of a waveguide to form respective first and second sets of pixels.

The first set of pixels may at least partially overlap the second set of pixels within a field of view of the display system. A first region of the field of view may include only pixels of the first set of pixels, and a second region of the field of view may include only pixels of the second set of pixels. A third region of the field of view may include pixels of the first set of pixels superimposed with at least some of the second set of pixels.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
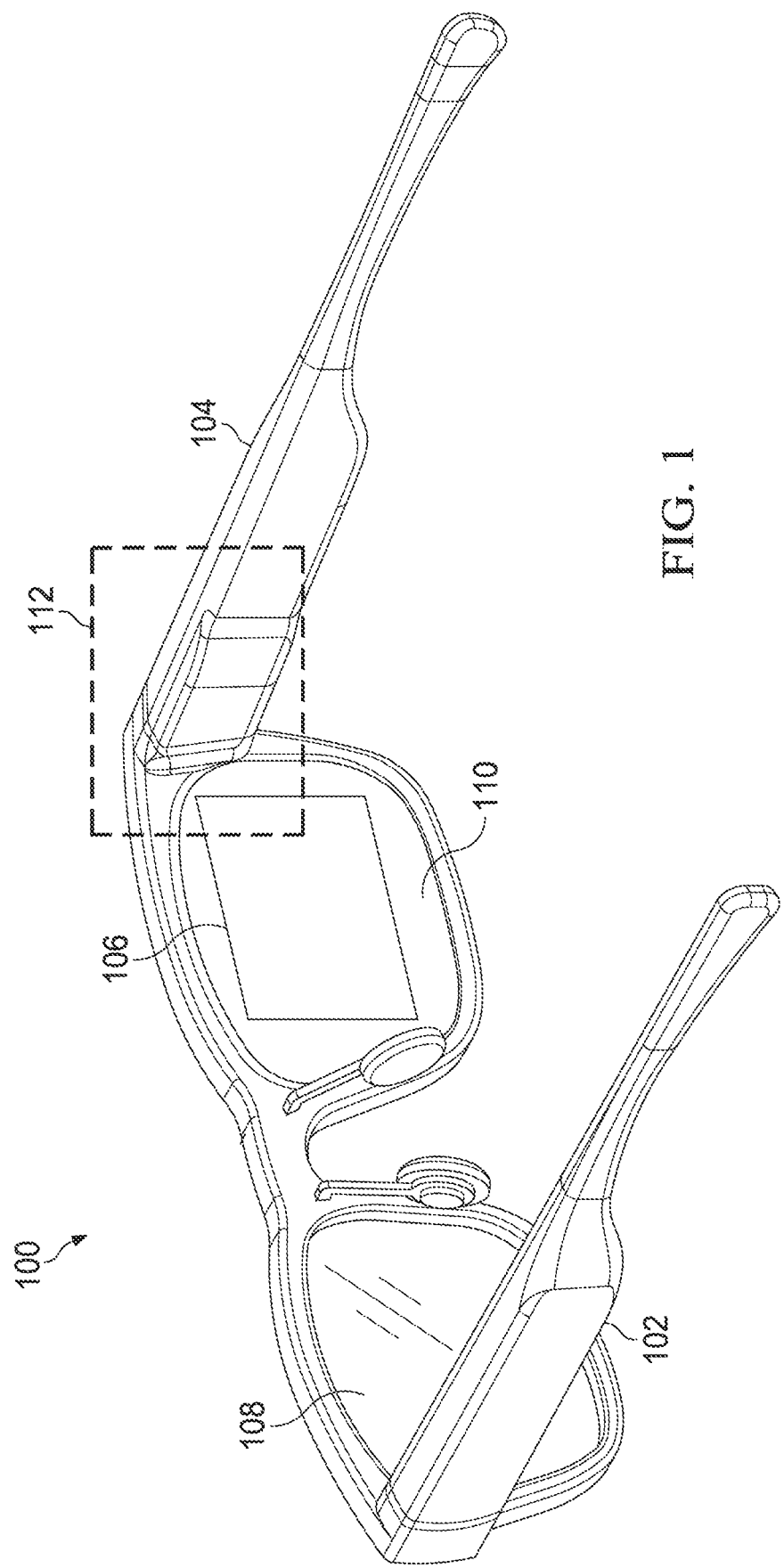
FIG. 1 illustrates a display system having an integrated laser projection system, in accordance with some embodiments.

Embodiments described herein relate to display systems, such as scanning laser projection systems, that include optical engines having multiple sets of laser light sources, each respectively including one or more of a green laser light source, a blue laser light source, and a red laser light source. By using multiple sets of semiconductor laser sources having relatively low threshold excitation levels, the lower end of the dynamic range for each of the various colors of laser light output by the optical engine is improved with respect to optical engines using only a single set of laser light sources with comparatively higher threshold excitation levels. Herein, the "threshold excitation level" of a laser light source refers to the lowest excitation level at which the laser light source's output is dominated by stimulated emission, rather than by spontaneous emission, in which the excitation level is correlated with the amount of power supplied to the laser light source. The ratio of the input electrical power for a laser light source to the resultant excitation of the laser light source is orders of magnitude greater when operating above the threshold excitation level compared to when operating below the threshold excitation level. Thus, operating a laser light source above its threshold excitation level is more power efficient than if the laser is operated below its threshold excitation level. Accordingly, by utilizing laser light sources with relatively low threshold excitation levels, the optical engines described herein are more energy efficient than conventional optical engines that utilize only a single set of laser light sources with high threshold excitation levels. Because more than one set of laser light sources is used in the optical engines of the present disclosure, the total illumination power of such optical engines is able to meet the requirements of a typical scanning display system.

In some embodiments, various wavelengths of laser light from the multiple sets of laser light sources of the optical engine are combined using dichroic beam splitters of a beam combiner. In some embodiments, each set of laser light sources of the optical engine outputs laser light having a different polarization with respect to laser light output by each other set of laser light sources of the optical engine, and polarizing beam splitters are used to combine the different polarizations of laser light. In some embodiments, the laser light from the sets of laser light sources of the optical engine is combined using respectively different set of dichroic beam splitters, such that each set of dichroic beam splitters outputs a respective combined laser light beam that is angularly separated with respect to each other combined laser light beam—a technique sometimes referred to herein as "angular separation."

In some embodiments, two or more angularly separated input laser light beams incident at a first scan mirror are scanned along a common plane through an optical relay of the scanning display system, such that two or more sets of partially overlapping pixels are output by the display system. In some embodiments, three or more angularly separated input laser light beams incident at a first scan mirror are scanned through an optical relay of the scanning display system, with first and second input laser light beams being scanned along a first plane and the remaining input laser light beams being scanned along a second plane that is different from the first plane, such that three or more sets of partially overlapping pixels are output by the display system.

Generally, each laser light source of the optical engine includes a submount and a laser die disposed on the submount. In some embodiments, multiple laser dies may be placed on a common submount of the optical engine. In one example, the optical engine includes a first laser light source that includes a first submount on which first and second blue laser dies are disposed, a second laser light source that includes a second submount on which first and second green laser dies are disposed, and a third laser light source that includes a third submount on which first and second red laser dies are disposed. In some embodiments, the collimating lenses at the output of each laser light source of the optical engine may have discrete, edge-trimmed lenses, with each lens being shaped to have an aperture that approximates the cross-sectional shape (e.g., non-circular elliptical) of the laser beam output by one or more corresponding laser dies of the optical engine, which may advantageously decrease the acceptable minimum distance between two laser dies positioned on the same submount. In some embodiments, the collimating lenses at the output of the optical engine may each include an array of lenses. In some embodiments, the collimating lenses at the output of the optical engine may include a single lens per pair of laser dies (i.e., with each pair of laser dies being disposed on a respective common submount), with the output laser light beam from each laser die being symmetrically de-centered from the output laser light beam from the other laser die in the pair. This symmetric decentering of the laser light beams output by the laser dies of each pair causes the beam combiner to produce combined laser light beams that are angularly separated. In some embodiments, the laser die spacing or path length from one or more of the collimating lenses to the beam combiner may be adjusted for each pair of commonly mounted laser die to better align the laser light beams output by laser dies of different pairs. In some embodiments, path length for a given pair of laser dies may be increased by passing the laser light beams generated by that pair of laser dies through a retroreflector prism disposed at and/or mounted to the beam combiner. In some embodiments, first and second sets of angularly separated laser light beams may intersect at the surface of the first scan mirror. In some embodiments, the amount of angular separation between the first and second sets of angularly separated laser light beams may be adjusted via a wedge prism disposed on the beam combiner or via separate facets of the retroreflector prism.

FIGS. 1-30 illustrate embodiments of an example display system in which various optical engines and beam combiners of the present disclosure may be implemented. It will be appreciated that the apparatuses and techniques of the present disclosure are not limited to implementation to this particular display system, but instead may be implemented in any of a variety of display systems using the guidelines provided herein.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable heads-up display (WHUD) that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Furthermore, in some embodiments the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
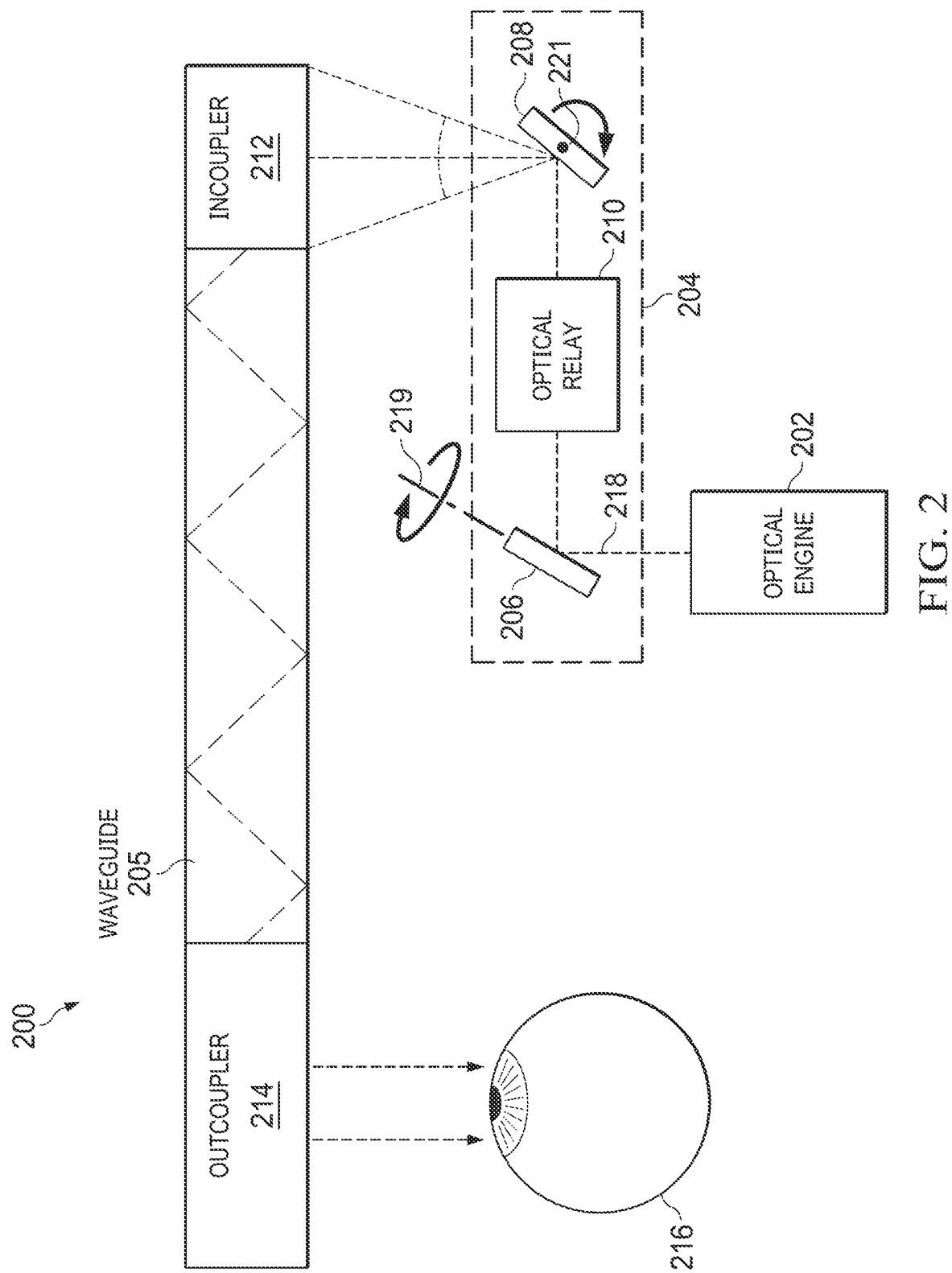
FIG. 2 illustrates a laser projection system having an optical scanner that includes an optical relay disposed between two scan mirrors, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 212 of the waveguide 205. In some embodiments, the scan mirror 206 oscillates or otherwise rotates around a first axis 219, such that the laser light 218 is scanned in only one dimension (i.e., in a line) across the surface of the second scan mirror 208. In some embodiments, the scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, an "exit pupil plane" in an optical system refers to the location along the optical path where light converges to a virtual aperture before exiting the optical system. For example, the possible optical paths of the laser light 218, following reflection by the first scan mirror 206, are initially spread along a first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture," In some embodiments, the exit pupil plane of the optical relay 210 is coincident with the incoupler 212. In some embodiments, an entrance pupil plane of the optical relay 210 is coincident with the first scan mirror 206.

According to various embodiments, the optical relay 210 includes one or more spherical, aspheric, parabolic, or freeform lenses that shape and direct the laser light 218 on the second scan mirror 208, and/or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes a laser emitter, such as an edge-emitting laser (EEL), that emits a laser light 218 having a substantially elliptical, non-circular cross-section. The optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to circularize the laser light 218 prior to convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and that may apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is propagated to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). For example, in some embodiments, a prism is used to steer light from the scan mirror 208 into the incoupler 212 so that light is coupled into incoupler 212 at the appropriate angle to encourage propagation of the light in waveguide 205 by TIR. As another example, in some embodiments, an exit pupil expander (e.g., an exit pupil expander 304 of FIG. 3, described below) such as a fold grating is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
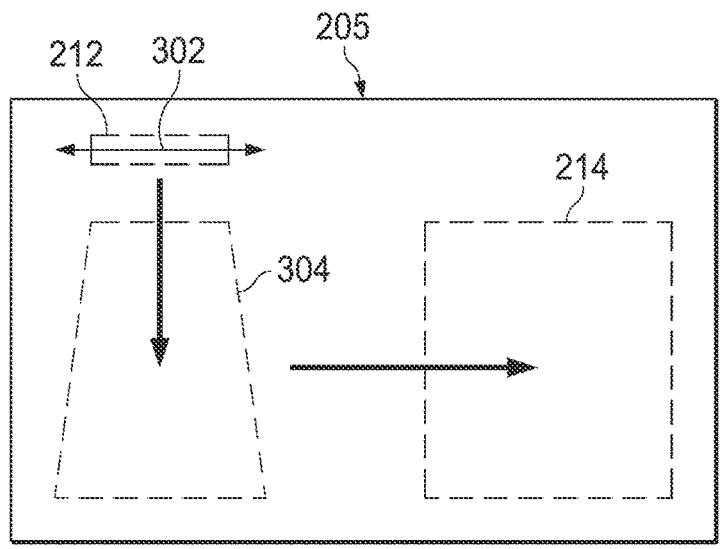
FIG. 3 illustrates a waveguide having an incoupler, outcoupler, and exit pupil expander, in accordance with some embodiments.

FIG. 3 shows an example of light propagation within the waveguide 205 of the laser projection system 200 of FIG. 2 in accordance with some embodiments. As shown, light received via the incoupler 212, which is scanned along the axis 302, is directed into an exit pupil expander 304 and is then routed to the outcoupler 214 to be output (e.g., toward the eye of the user). In some embodiments, the exit pupil expander 304 expands one or more dimensions of the eyebox of a WHUD that includes the laser projection system 200 (e.g., with respect to what the dimensions of the eyebox of the WHUD would be without the exit pupil expander 304). In some embodiments, the incoupler 212 and the exit pupil expander 304 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 3 shows a substantially ideal case in which the incoupler 212 directs light straight down (with respect to the currently illustrated view) in a first direction that is perpendicular to the scanning axis 302, and the exit pupil expander 304 directs light to the right (with respect to the currently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

Figure 4:
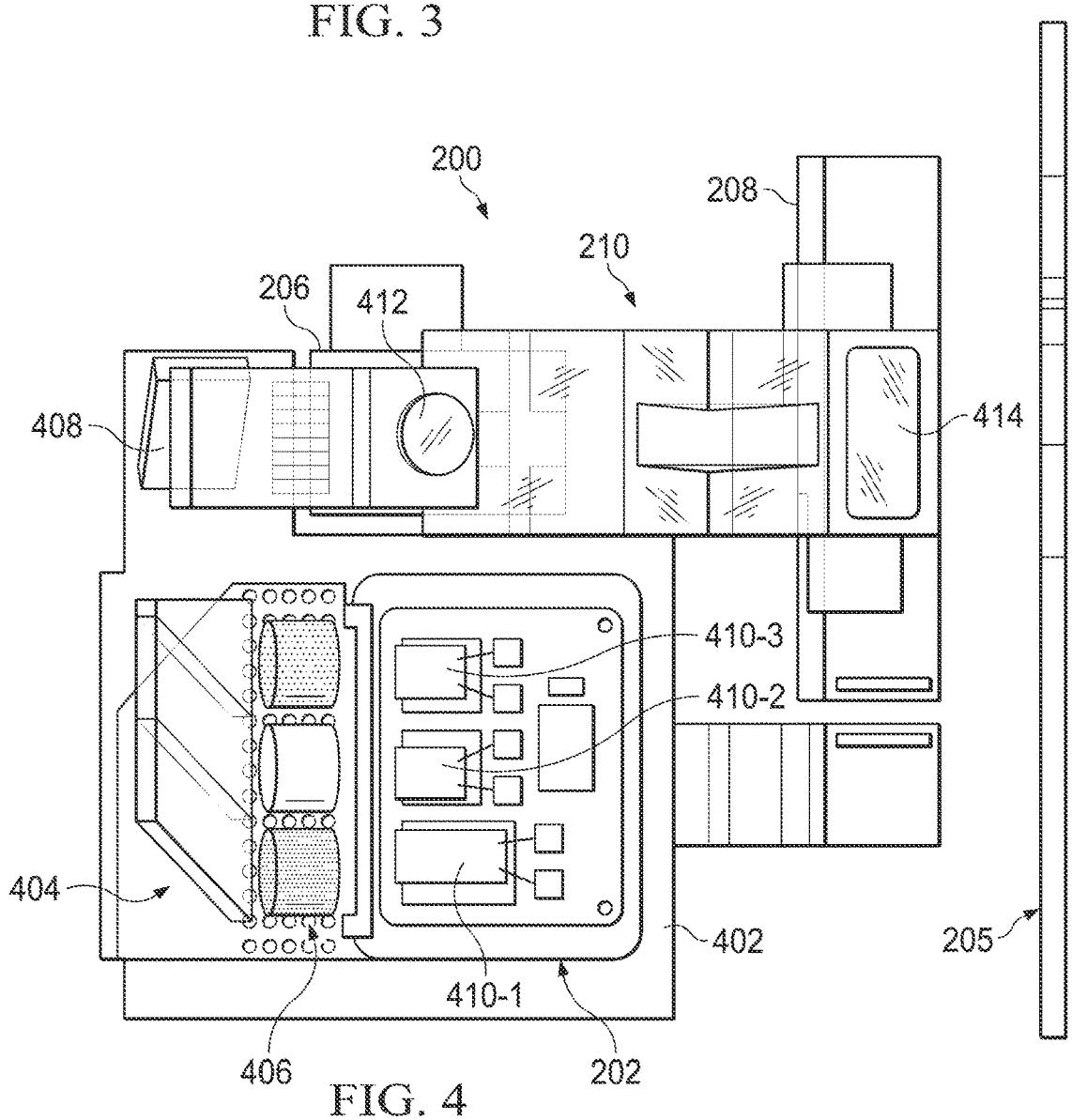
FIG. 4 illustrates a laser projection system that includes a molded reflective relay disposed between two scan mirrors, in accordance with some embodiments.

FIG. 4 shows an example embodiment of the laser projection system 200 in which the optical relay 210 comprises a molded reflective relay. As shown, the laser projection system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimation lenses (e.g., three collimation lenses for the corresponding three laser light sources 410-1, 410-2, and 410-3 in the example above, collectively referred to herein as laser light sources 410), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the corresponding primary lenses 406 to be combined at the beam combiner 404 to produce the laser light (i.e., laser light 218 shown in FIG. 2) to be projected by the laser projection system 200. The beam combiner 404 receives the individual laser light inputs and outputs a combined laser light 218 to the mirror 408, which redirects the laser light 218 onto a reflective surface 412 of the first scan mirror 206. The first scan mirror 206 scans the laser light 218 into the optical relay 210 across a first scanning axis.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings or metasurfaces. In some embodiments, one or more reflective surfaces of the molded reflective relay reflect light via TIR and therefore do not require mirror coatings or fabricated metasurfaces to reflect light. Such molding can simplify the fabrication of the laser projection system 200 as it facilitates the incorporation of some or all of the optical surfaces of the relay into a single element, rather than several distinct, separate elements. Further, in some embodiments, the use of a molded structure allows for light to be propagated through one or more regions of the optical relay 210 via TIR, rather than using mirror coatings to propagate light through those regions.

The optical relay 210 is configured to route the laser light 218 toward a reflective surface 414 of the scan mirror 208. The scan mirror 208 scans the laser light 218 across the incoupler 212 of the waveguide 205 along a second scanning axis. In some embodiments, the second scanning axis is perpendicular to the plane along which the laser light propagates through the optical relay 210.

Figure 5:
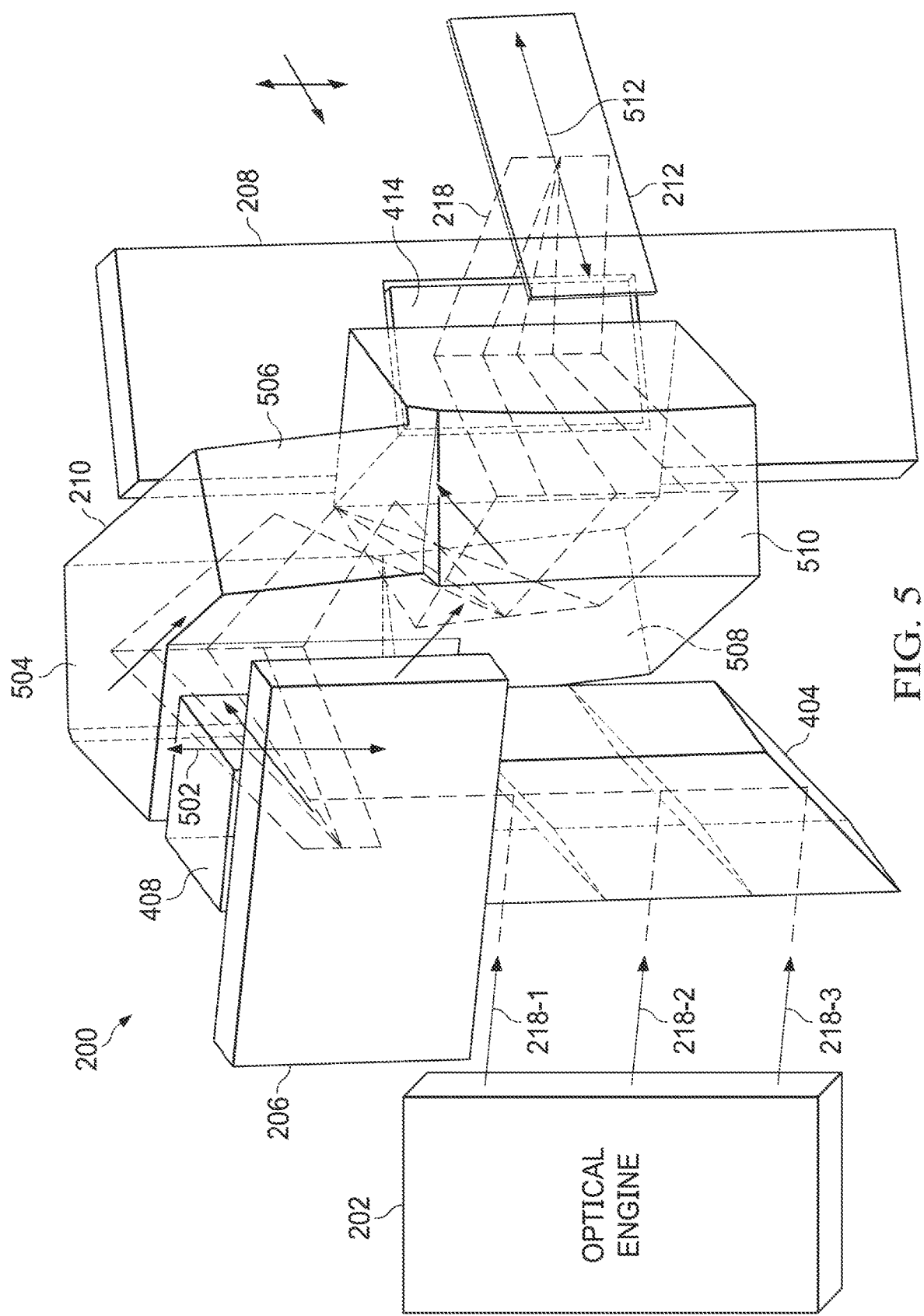
FIG. 5 illustrates a laser projection system that includes a molded reflective relay disposed between two scan mirrors, and illustrating optical paths through the molded reflective relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the scan mirror 206. The scan mirror 206 scans the laser light 218 along a first scanning axis 502 into the optical relay 210. The optical relay 210 reflects the laser light 218 off of reflective surfaces 504, 506, 508, and 510, then outputs the laser light 218 toward the reflective surface 414 of the scan mirror 208. The scan mirror 208 then scans the laser light 218 across the incoupler 212 along a second scanning axis 512, where the laser light 218 converges onto the incoupler 212 at most or all achievable scan angles of the scan mirror 206.

Figure 6:
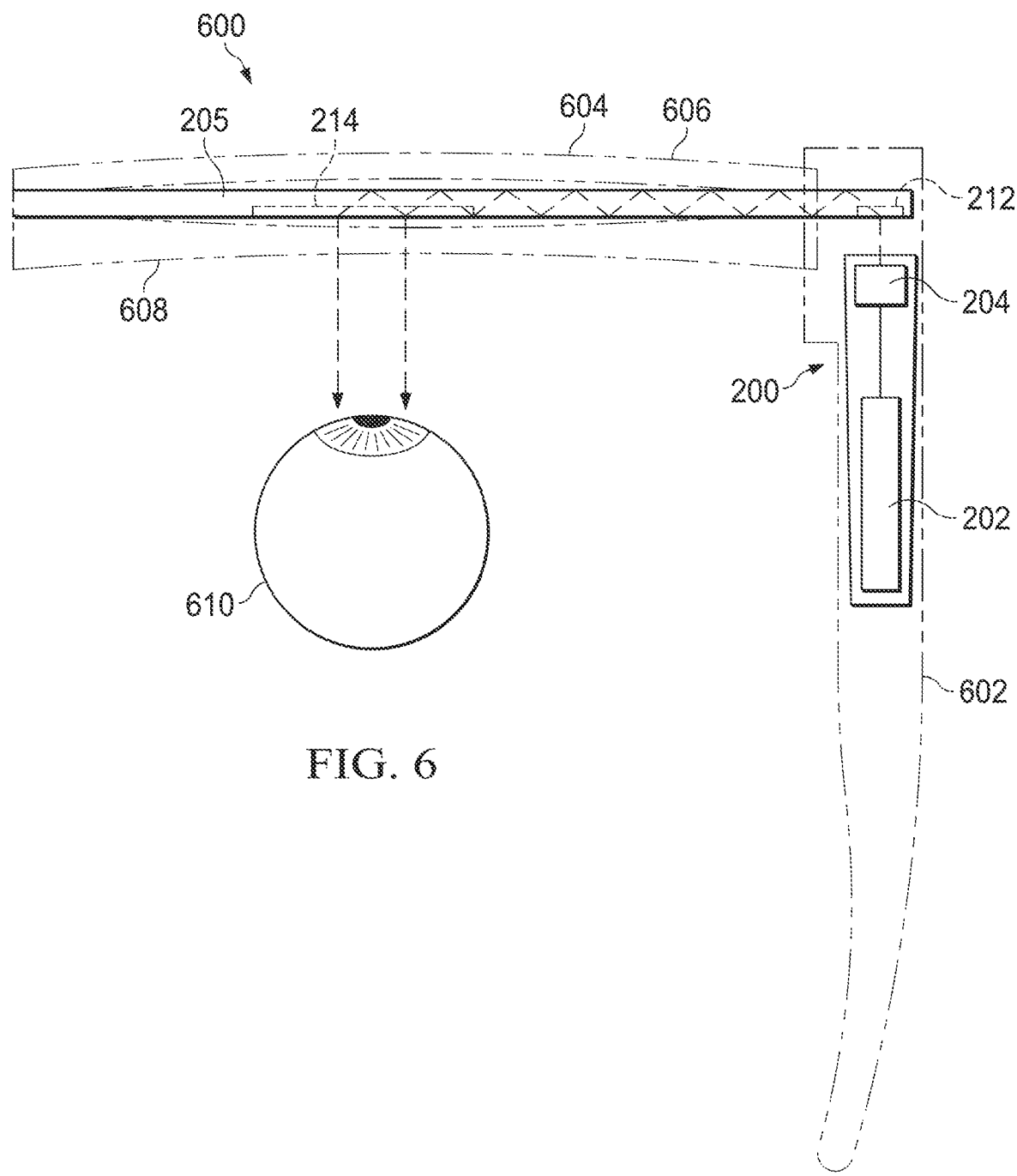
FIG. 6 illustrates a partially transparent view of a wearable heads-up display (WHUD) that includes a laser projection system, in accordance with some embodiments.

FIG. 6 illustrates a portion of a WHUD 600 that includes the laser projection system 200 of FIG. 2. In some embodiments, the WHUD 600 represents the display system 100 of FIG. 1. In the depicted embodiment, the optical engine 202, the optical scanner 204, the incoupler 212, and a portion of the waveguide 205 are included in an arm 602 of the WHUD 600.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser projection system 200 are combined (e.g., overlayed) with real-world images of the user's environment when projected onto the eye 610 of the user to provide an AR experience to the user.

Although not shown in the depicted example, in some embodiments additional optical elements are included in any of the optical paths between the optical engine 202 and the incoupler 212, in between the incoupler 212 and the outcoupler 214, and/or in between the outcoupler 214 and the eye 610 of the user (e.g., in order to shape the laser light for viewing by the eye 610 of the user). As an example, in certain embodiments a prism is used to steer light from the optical scanner 204 into the incoupler 212 so that light is coupled into incoupler 212 at the appropriate angle to encourage propagation of the light in waveguide 205 by TIR. As another independent example, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
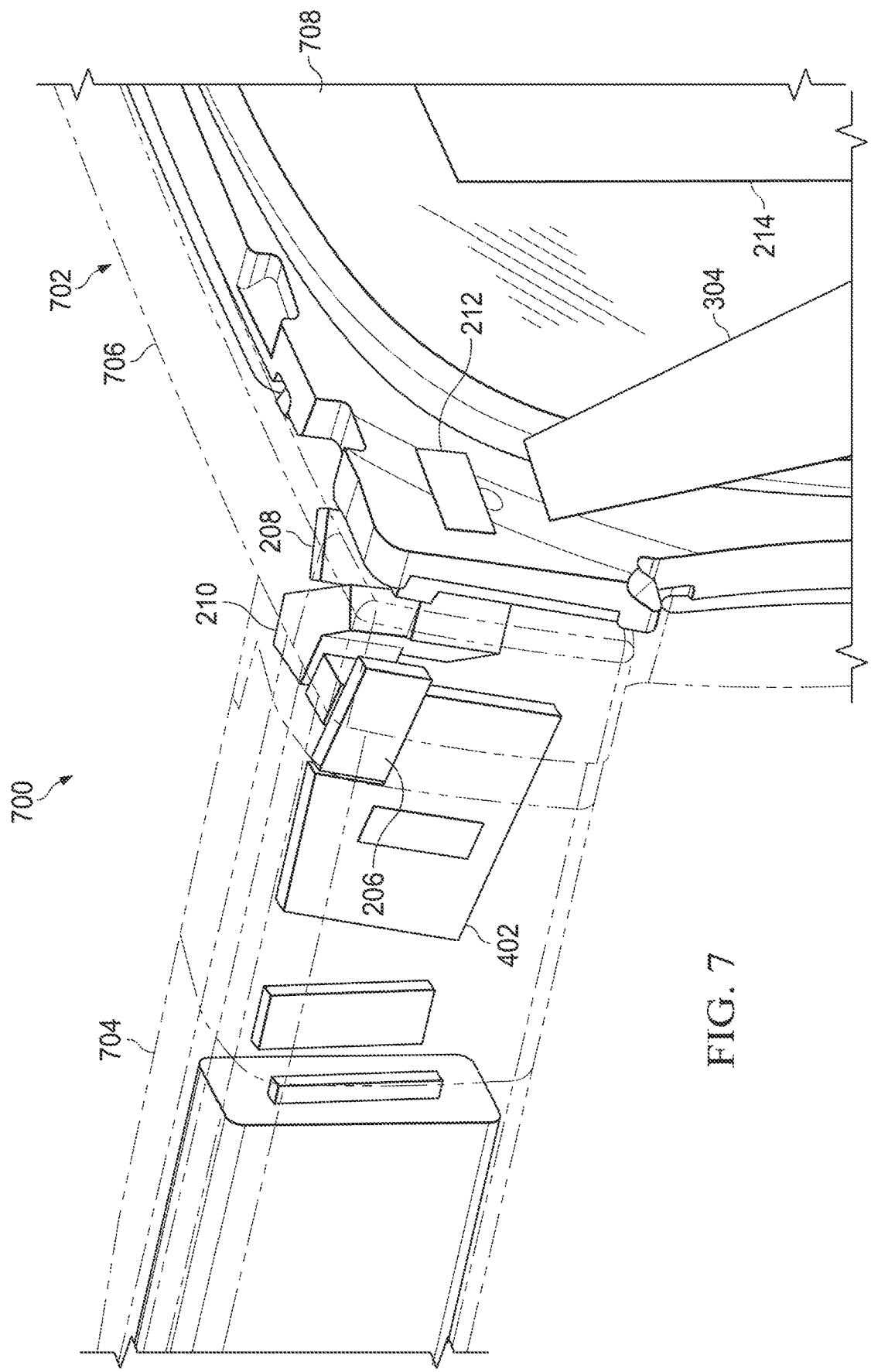
FIG. 7 illustrates a partially transparent front isometric view of a laser projection system disposed within a WHUD, in accordance with some embodiments.
Figure 8:
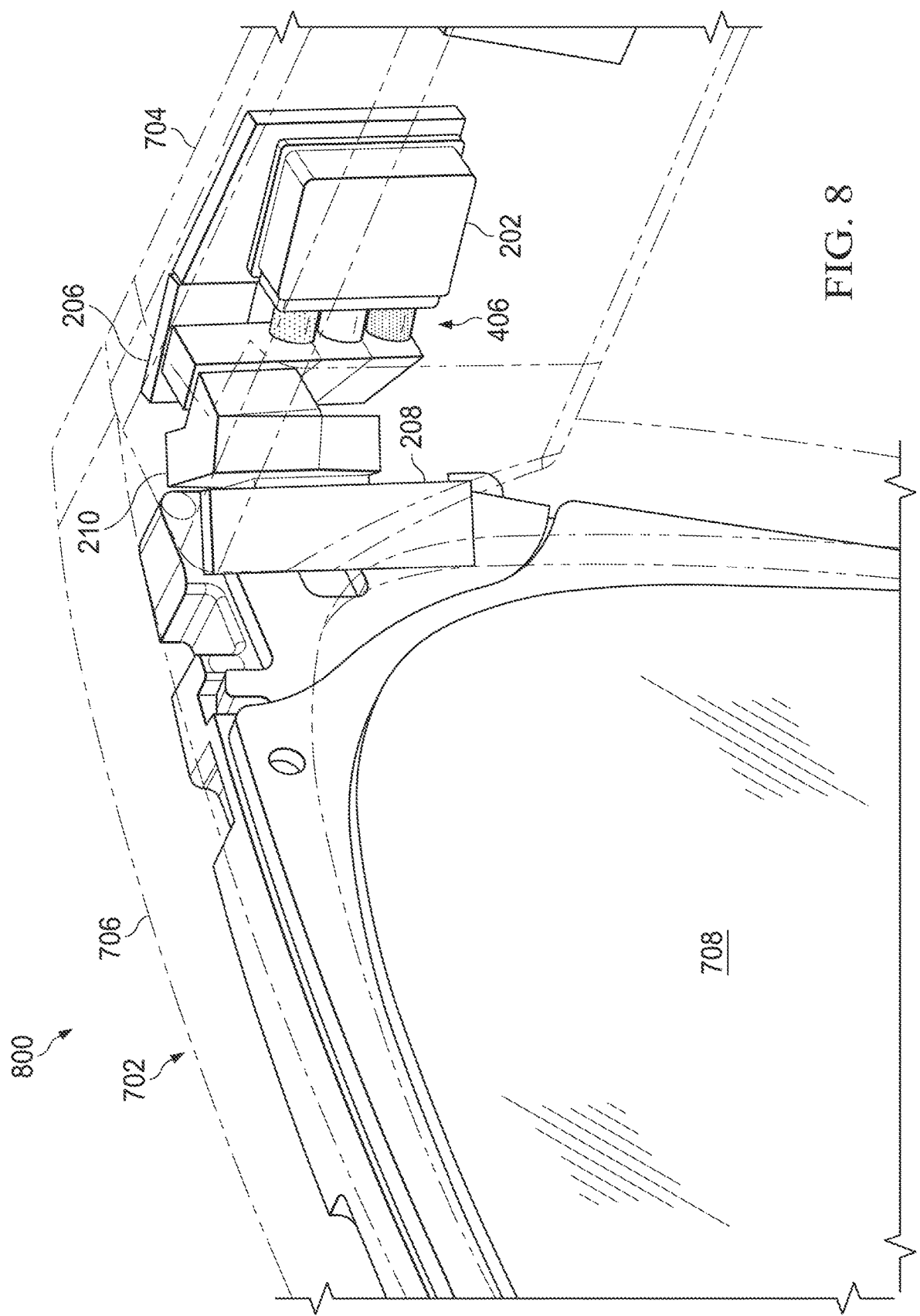
FIG. 8 illustrates a partially transparent rear isometric view of a laser projection system disposed within a WHUD, in accordance with some embodiments.

FIGS. 7 and 8 show two different perspective, partially transparent views 700 (FIG. 7) and 800 (FIG. 8) of a portion of a WHUD 702, which represents the WHUD 600 of FIG. 6 or the display system 100 of FIG. 1. The WHUD 702 includes an example arrangement of the laser projection system 200 of FIGS. 2, 4, and 5 for an embodiment in which the optical relay 210 is a molded reflective relay. In some embodiments, the WHUD 702 corresponds to the display system 100 of FIG. 1, and the illustrated portion of the WHUD 702 corresponds to the region 112 of the display system 100.

As shown by the views 700 of FIG. 7 and 800 of FIG. 8, the arm 704 of the WHUD 702 houses the optical engine 202, the primary lenses 406 and at least a portion of the first scan mirror 206, the optical relay 210, and the substrate 402. A frame section 706 of the WHUD 702 houses the second scan mirror 208 and portions of the first scan mirror 206, the optical relay 210, and the substrate 402. As shown by the view 700 of FIG. 7, the incoupler 212 and the outcoupler 214 of the waveguide 205 (not fully shown in the views of FIGS. 7 and 8), are each embedded in or otherwise disposed on the lens 708 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning axis, and the second scan mirror 208 oscillates or otherwise rotates to scan the laser light along a second scanning axis that is perpendicular to the first scanning axis. Laser light reflected by the second scan mirror 208 converges to a line at the incoupler 212. Relayed laser light received at the incoupler 212 is routed to the outcoupler 214 via the waveguide 205. The light received at the outcoupler 214 is then directed out of the waveguide 205 (e.g., toward the eye of a user of the WHUD 702).

Figure 9:
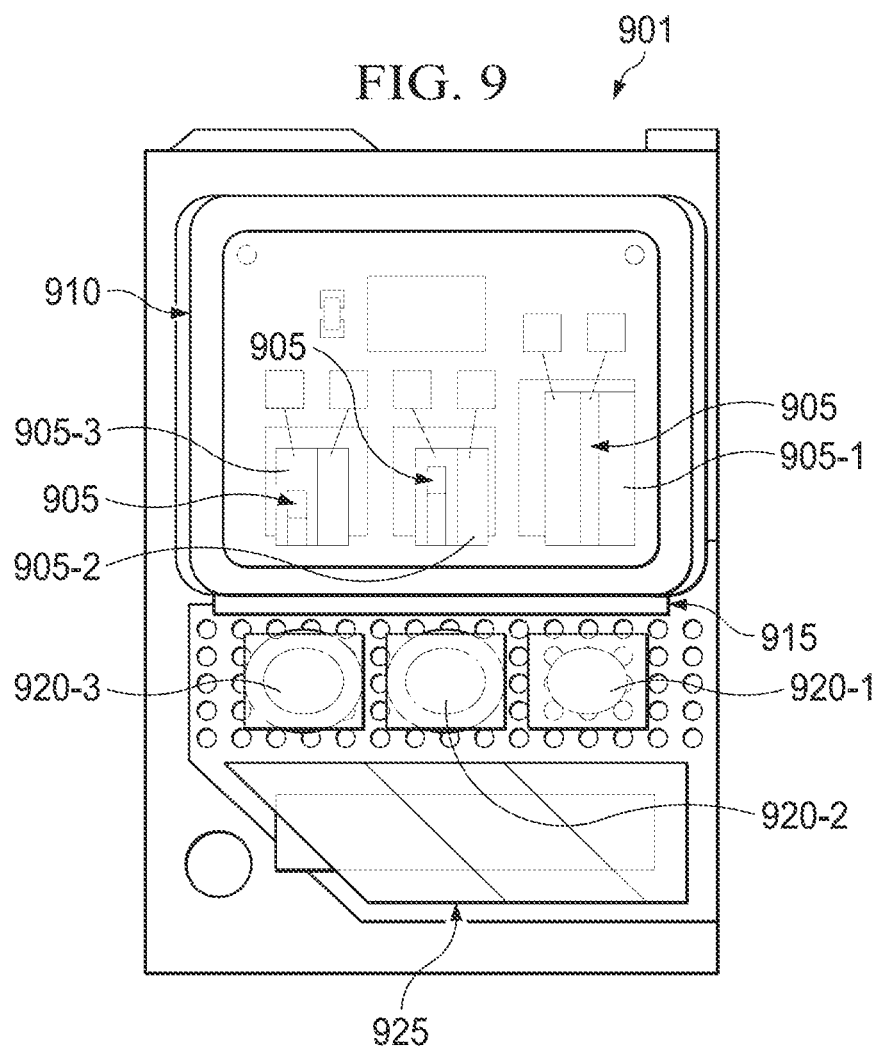
FIG. 9 illustrates an optical engine having a single set of laser light sources including a red laser light source, a green laser light source, and a blue laser light source disposed in an enclosure.

FIG. 9 shows an optical engine 901 having a single set of laser light sources 905 including a red laser light source 905-1, a green laser light source 905-2, and a blue laser light source 905-3 disposed in an enclosure 910. Laser light beams generated by the laser light sources 905 of the optical engine 901 propagate out of the enclosure 910 through a window 915, through respective collimating lenses 920, and into a beam combiner 925 (such as a dichroic filter combiner). In certain embodiments, the beam combiner 925 may include dichroic beam splitters (not separately depicted in FIG. 9), each tuned to a different wavelength of laser light output by the laser light sources 905 of the optical engine 901. The beam combiner 925 combines the laser light received from the collimating lenses 920 and redirects the combined laser light to eventually be projected out of the display system (not shown) that includes the optical engine 901.

Figure 10:
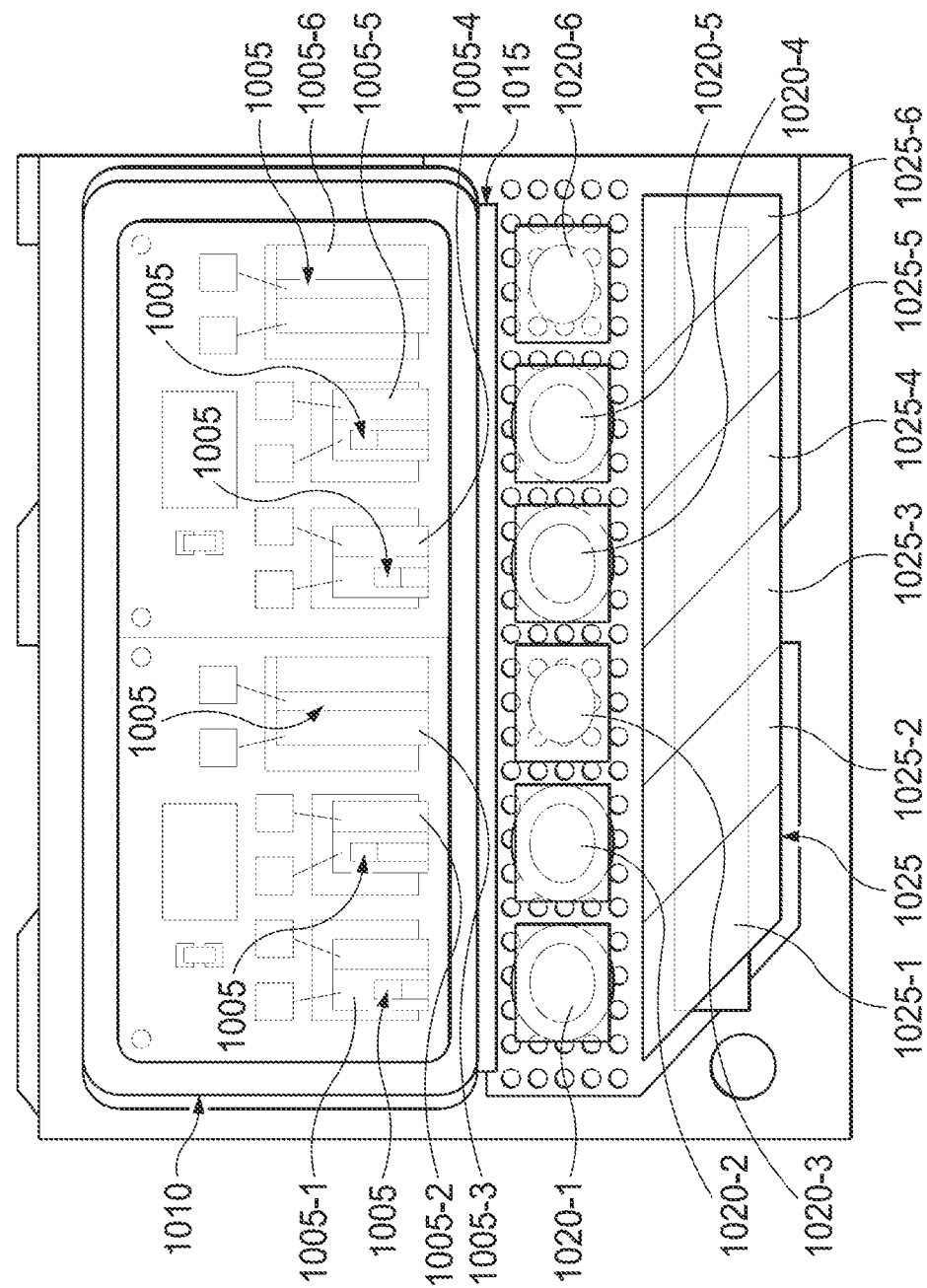
FIG. 10 illustrates an optical engine having two sets of laser light sources, each set including a red laser light source, a green laser light source, and a blue laser light source and being disposed in an enclosure, in accordance with some embodiments.

FIG. 10 shows an optical engine 1001 (e.g., which may be an embodiment of the optical engine 202 of FIG. 2) having two sets of laser light sources 1005 (e.g., which may be an embodiment of the laser light sources 410 of FIG. 4), each including a respective red laser light source, a green laser light source, and a blue laser light source disposed in an enclosure 1010. In particular, a first set of laser light sources includes a blue laser light source 1005-01, a green laser light source 1005-2, and a red laser light source 1005-3; a second set of laser light sources includes a blue laser light source 1005-04, a green laser light source 1005-5, and a red laser light source 1005-6. Laser light beams generated by the two sets of laser light sources 1005 propagate out of the enclosure through a window 1015, through respective primary lenses 1020-1, 1020-2, 1020-3, 1020-4, 1020-5, and 1020-6 (collectively referenced herein as primary lenses 1020, which may be an embodiment of the primary lenses 406 of FIG. 4), and into a beam combiner 1025 (e.g., which may be an embodiment of the beam combiner 404 of FIG. 4) that includes dichroic beam splitters 1025-1, 1025-2, 1025-3, 1025-4, 1025-5, and 1025-6, each tuned to a different wavelength of laser light output by the laser light sources of the optical engine. The beam combiner 1025 combines the laser light beams received via primary lenses 1020 to produce one or more combined laser light beams and redirects each combined laser light beam into an optical scanner (not depicted here, but which may comprise an embodiment of the optical scanner 204 of FIG. 2), which scans and focuses each combined laser light beam onto the incoupler of a waveguide. Each combined laser light beam is projected via the waveguide out of the display system that includes the optical engine (e.g., onto the eye of a user of the display system). It should be understood that the depicted arrangement of the laser light sources of the optical engine can be modified according to various embodiments to account for thermal considerations, electronic drive considerations, the arrangement of the beam splitters of the beam combiner, or other applicable considerations.

Figure 11:
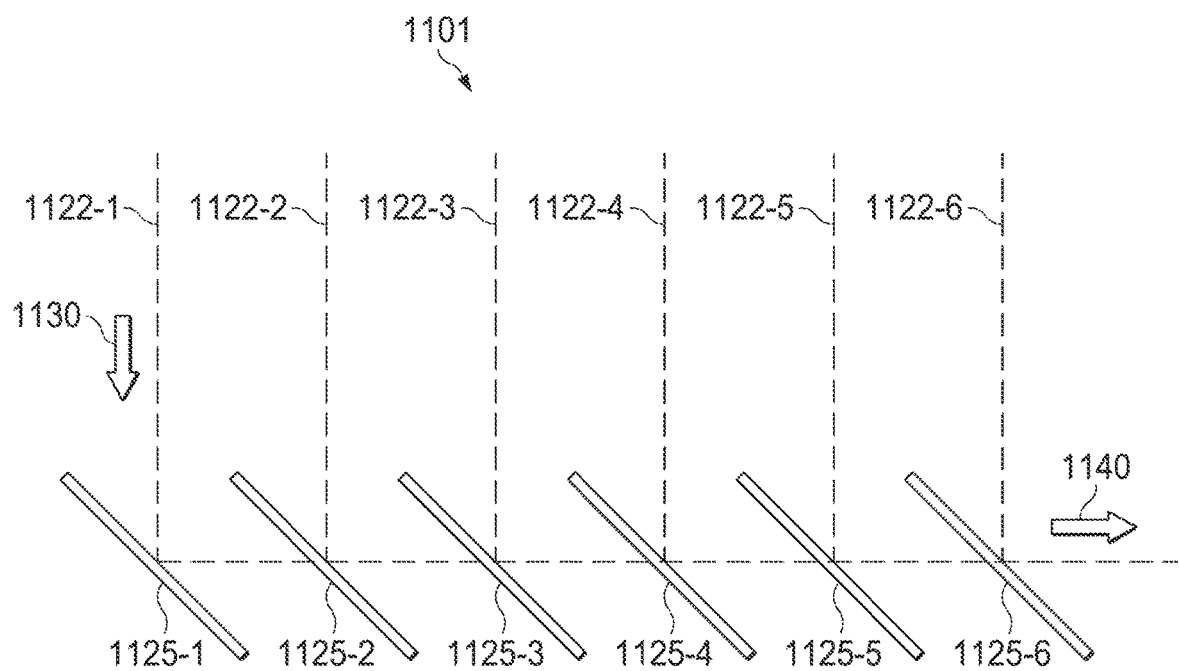
FIG. 11 illustrates an example arrangement of dichroic beam splitters arranged in series in the beam combiner of FIG. 10, in accordance with some embodiments.

One technique for combining different beams of laser light output by the optical engine 1001 of FIG. 10 is to use a beam combiner having one or more dichroic beam splitters to combine different wavelengths of light. FIG. 11 shows an example arrangement of dichroic beam splitters (sometimes referred to as dichroic mirrors) in a beam combiner 1101 that may correspond to some embodiments of the beam combiner 1025 of FIG. 10. In the depicted embodiment, each beam of laser light output in direction 1130 by laser light sources 1122-1 through 1122-6 (collectively referenced herein as laser light sources 1122) are first incident on a respective dichroic beam splitter 1125-1 through 1125-6 prior to being combined. Each dichroic beam splitter may reflect light that is incident on a first surface of that dichroic beam splitter and may transmit light that is incident on a second surface of that dichroic beam splitter. In the depicted embodiment, the dichroic beam splitters 1125-1 through 1125-6 are arranged in series, such that laser light reflected by the reflective first surface of each dichroic beam splitter travels along a common axis in a common direction, through one or more transmissive second surfaces of other dichroic beam splitters in some cases, such that the six beams of laser light reflected by the dichroic beam splitters are combined into a single beam projected in direction 1140. In certain embodiments, each dichroic beam splitter may be tuned so that its reflective first surface is only reflective to a particular wavelength or wave band of light corresponding to or including the wavelength of laser light received by that dichroic beam splitter from the optical engine at its reflective first surface. In some embodiments, the laser sources of the optical engine of FIG. 10 may be arranged in order of ascending or descending wavelengths in order to reduce the complexity of the beam combiner.

Figure 12:
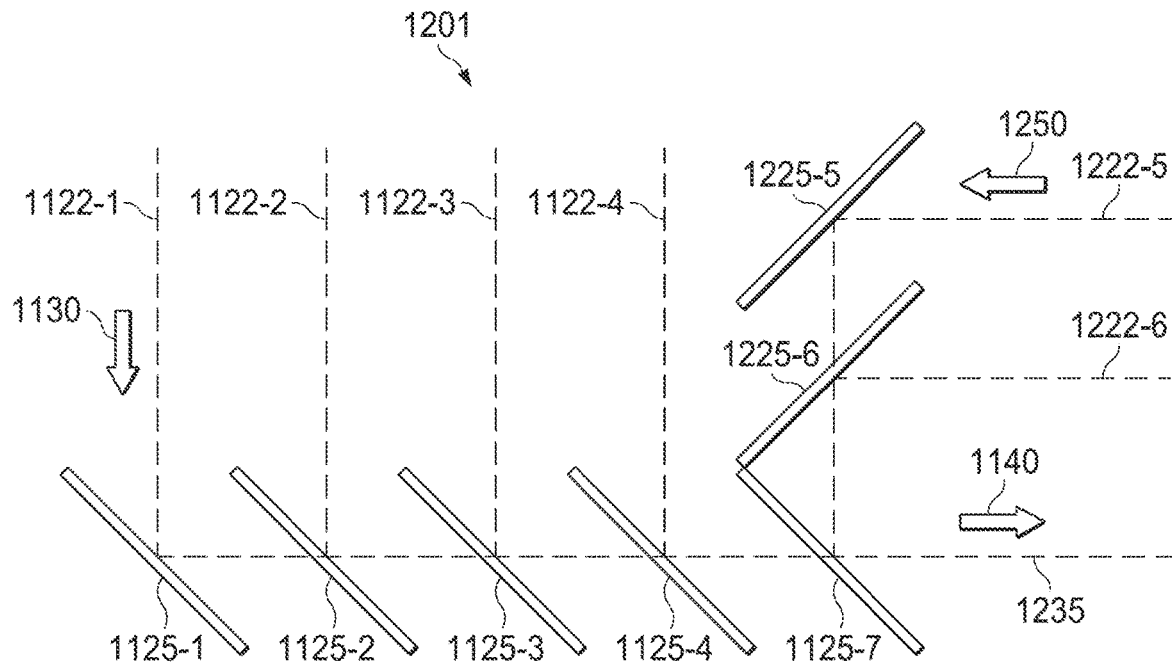
FIG. 12 illustrates an example arrangement of dichroic beam splitters, with at least some of the beam splitters being arranged perpendicularly to the others in the beam combiner of FIG. 10, in accordance with some embodiments.

FIG. 12 shows another example arrangement of dichroic beam splitters corresponding to some embodiments of the beam combiner of FIG. 10. In a manner similar to that described above with respect to beam combiner 1101 of FIG. 11, each beam of laser light output in direction 1130 by laser light sources 1222-1 through 1222-4 are first incident on a respective dichroic beam splitter 1225-1 through 1225-4 prior to being combined. As before, each dichroic beam splitter may reflect light that is incident on a first surface of that dichroic beam splitter and may transmit light that is incident on a second surface of that dichroic beam splitter. Once again, the dichroic beam splitters 1225-1 through 1225-4 are arranged in series, such that laser light reflected by the reflective first surface of each of those dichroic beam splitters travels along a common axis in a common direction 1140. However, in contrast to the example of FIG. 11, two of the beams of laser light (beams 1222-5 and 1222-6) are received along paths that are aligned perpendicularly to the paths of the other four beams of laser light (beams 1222-1 through 1222-4), and the corresponding dichroic beam splitters 1225-5 and 1225-6 of the beam combiner 1201 are not aligned in series with the other dichroic beam splitters 1225-1 through 1225-4. Instead, dichroic beam splitters 1225-5 and 1225-6 are arranged to reflect beams 1222-5 and 1222-6, which are projected in a common direction 1250, toward an additional dichroic beam splitter 1225-7 along direction 1130. The additional dichroic beam splitter 1225-7 is positioned in series with the dichroic beam splitters 1225-1 through 1225-4 that reflect beams 1222-1 through 1222-4, such that beams 1222-5 and 1222-6 are combined with beams 1222-1 through 1222-4 at the additional dichroic beam splitter 1225-7 to form a single combined beam 1235 projected in direction 1140.

Figure 13:
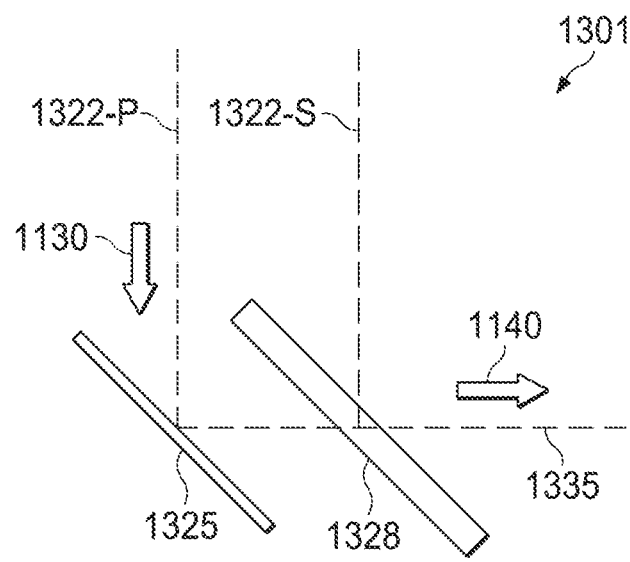
FIG. 13 illustrates an example arrangement of the beam combiner of FIG. 10 in which a polarizing beam splitter combines different polarizations of laser light beams, in accordance with some embodiments.

Another technique for combining different beams of laser light (e.g., those output by the optical engine 1001 of FIG. 10) is to use a beam combiner having one or more polarizing beam splitters to combine different polarizations of light. FIG. 13 shows an example arrangement of a beam combiner 1301 that uses one or more polarizing beam splitters to combine laser light beams output by the optical engine. In the depicted example, a first laser light output by the optical engine of FIG. 10 is polarized to have either "p" polarization (e.g., light having an electric field that is polarized parallel to the plane of incidence before and after reflection at the beam combiner) or an "s" polarization (e.g., light having an electric field that is polarized perpendicular to the plane of incidence before and after reflection at the beam combiner). Each p-polarized beam 1322-P of laser light is directed onto a mirror 1325 of the beam combiner, while each s-polarized beam 1322-S of laser light is directed onto a polarizing beam splitter 1328. The mirror 1325 is reflective of p-polarized light (or, in some embodiments, all light), while the polarizing beam splitter is transmissive of p-polarized light and is reflective of s-polarized light. In this way, p-polarized light incident on the mirror is reflected along a path that passes through the polarizing beam splitter and is transmitted by the polarizing beam splitter, while the s-polarized light is incident on and reflected by the polarizing beam splitter, such that the p-polarized light and the s-polarized light are combined at the polarizing beam splitter 1301.

Figure 14:
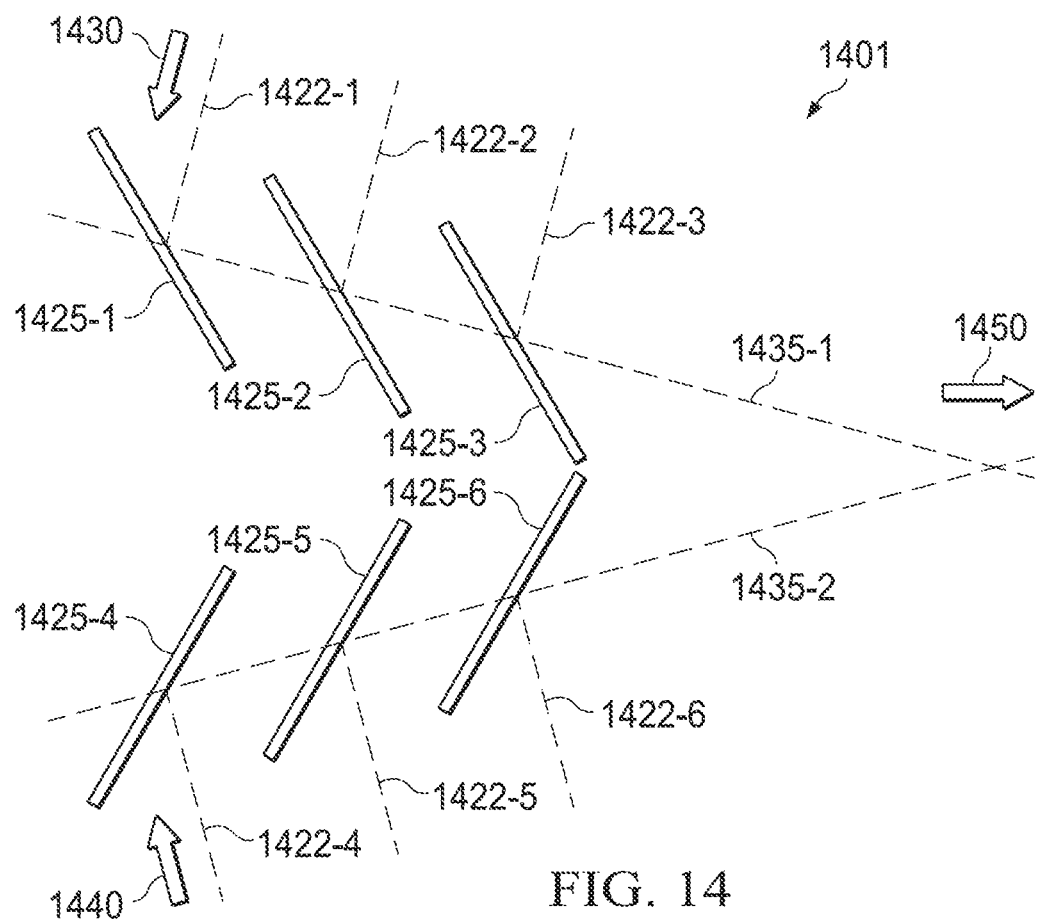
FIG. 14 illustrates an example arrangement of first and second sets of dichroic beam splitters in the beam combiner of FIG. 10, where the two sets of dichroic beam splitters produce angularly separated combined laser light beams, in accordance with some embodiments.

Another technique for combining different beams of laser light output by the optical engine of FIG. 10 is to combine two subsets of the beams of laser light into two respective combined laser light beams that are angularly separated. FIG. 14 shows an example arrangement of a beam combiner 1401 corresponding to some embodiments of the beam combiner of FIG. 10. The beam combiner 1401 includes a first set of dichroic beam splitters 1425-1, 1425-2, and 1425-3 that combine a first set of beams 1422-1, 1422-2, and 1422-3; and a second set of dichroic beam splitters 1425-4, 1425-5, and 1425-6 that combine a second set of beams (beams 1422-4, 1422-5, and 1422-6). In the present example, the first set of beams and the second set of beams propagate toward the first and second sets of dichroic beam splitters from substantially different directions 1430 and 1440, respectively. The first set of dichroic beam splitters 1425-1, 1425-2, and 1425-3 combines the first set of beams 1422-1, 1422-2, and 1422-3 into a first combined laser light beam 1435-1, and the second set of dichroic beam splitters combines the second set of beams 1425-4, 1425-5, and 1425-6 into a second combined laser light beam 1435-2, where the first and second combined laser light beams propagate along optical paths that are angled with respect to one another. That is, the first combined laser light beam 1435-1 and second combined laser light beam 1435-2 are not parallel with respect to one another. In some embodiments, the optical engine of FIG. 10 may be divided into two separate optical engines to provide the sets of laser light beams along the illustrated optical paths toward the sets of dichroic beam splitters. In some embodiments, one or more optical elements (not shown) such as mirrors or beam splitters may be disposed in the optical paths between the optical engine and one or both sets of dichroic beam splitters in order to direct the laser light beams from the optical engine to the first and/or second sets of dichroic beam splitters along the illustrated optical paths.

In some embodiments, the angular separation between the first combined laser light beam 1435-1 and second combined laser light beam 1435-2 may be relatively large, such that the first and second combined laser light beams can be mapped onto adjacent regions of the field of view (FOV) of a display system.

Figure 15:
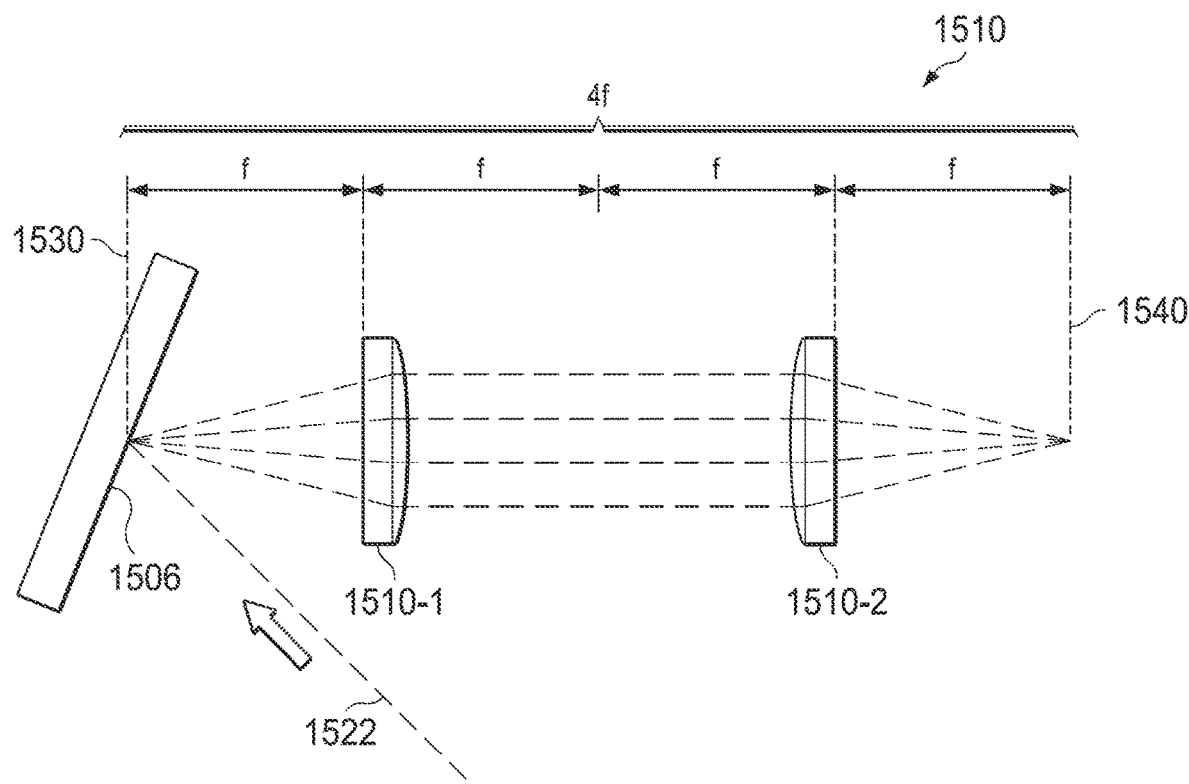
FIG. 15 illustrates a portion of an optical scanner that includes a 4f relay, in accordance with some embodiments.

FIG. 15 partially depicts an example of an optical scanner (e.g., optical scanner 204 of FIG. 2) that includes a 4f relay (an optical relay in which the distance between the scanner plane and the ocular pupil plane is four times the focal distance) as its optical relay. In the context of the depicted embodiment, the 4f optical relay 1510 includes a first lens 1510-1 and a second lens 1510-2, positioned such that the distance between the scanner plane 1530 at the scan mirror 1506 which may be considered an embodiment of scan mirror 206 of FIG. 2) and the ocular pupil plane 1540 to which the scanned beam converges is four times the focal distance f, with the first lens 1510-1 being disposed at a distance from the scanner plane 1530 equal to the focal distance f and the second lens 1510-2 being disposed at a distance from the pupil plane that is also equal to the focal distance f. The lenses of the 4f optical relay 1510 may be shaping lenses or collimating lenses. In the present example, a single input laser light beam 1522 is incident on the scan mirror 1506 and is then scanned across the 4f optical relay 1510, to subsequently converge to a pupil plane 1540 (e.g., at the incoupler 212 of the waveguide 205 of FIG. 2).

Figure 16:
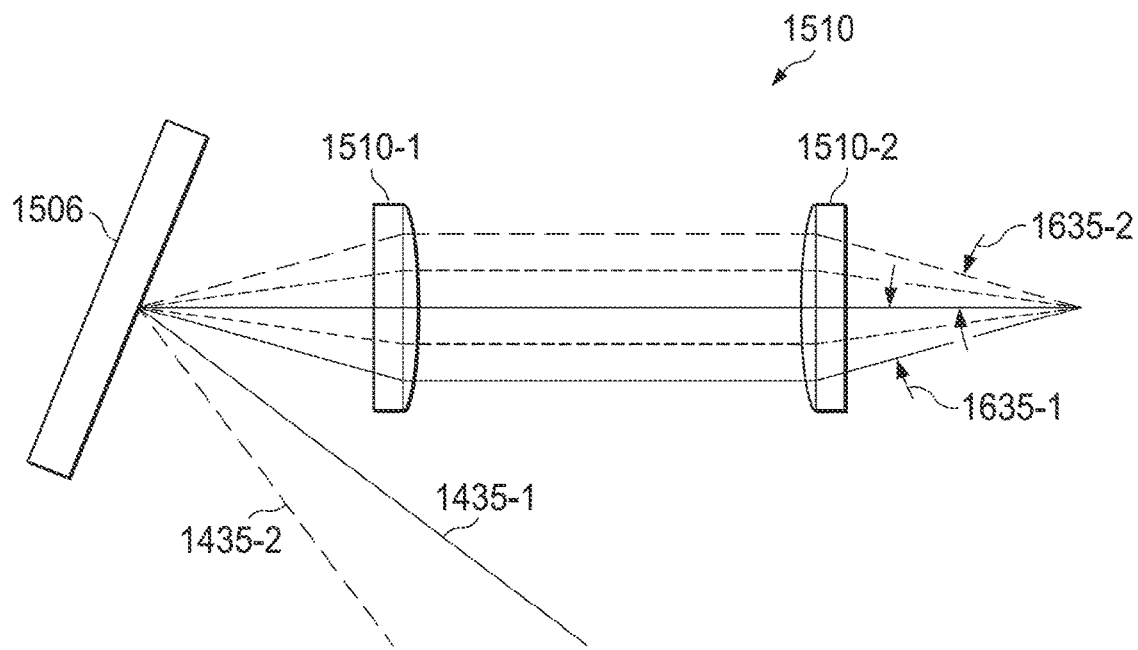
FIG. 16 illustrates a portion of an optical scanner that includes a 4f relay, with first and second angularly separated input laser light beams being divided between two different scan regions corresponding to two different fields of view of the display system, in accordance with some embodiments.

FIG. 16 shows an example of the optical scanner 1510 of FIG. 15, where first and second angularly separated input laser light beams (e.g., the first combined laser light beam 1435-1 and second combined laser light beam 1435-2 of FIG. 14) are incident on the scan mirror. The first laser light beam is scanned across a first section (corresponding to FOV 1635-1, approximately half) of the scan region between the scan mirror and the pupil plane, and the second laser light beam is scanned across a second section (corresponding to FOV 1635-2, approximately half) of the scan region, with each section of the scan region corresponding to a respectively different FOV, such that the overall FOV of the display system is effectively expanded compared to both arrangements in which only a single set of laser light sources was used and those in which the scan regions of each combined laser light beam (corresponding to each set of laser light sources) substantially overlapped. In some embodiments, the first and second sections of the scan region (respectively corresponding to FOV 1635-1 and FOV 1635-2) may partially overlap. In some embodiments, the first and second sections of the scan region may be non-overlapping.

In addition to effectively expanding the overall FOV provided by the display system, certain embodiments may provide an additional benefit resulting at least in part from having adjacent FOVs generated from separate light sources: reduced MEMS power consumption based on smaller scan angles of the scanning mirror. In particular, embodiments utilizing multiple angular input light beams can cover the same FOV in such smaller scan angles, thereby utilizing less power.

In some embodiments, the angular separation between the first combined laser light beam 1435-1 and second combined laser light beam 1435-2 of FIG. 14 may be relatively small, such that the first and second combined laser light beams mostly overlap the same FOV, but superimpose pixels.

Figure 17:
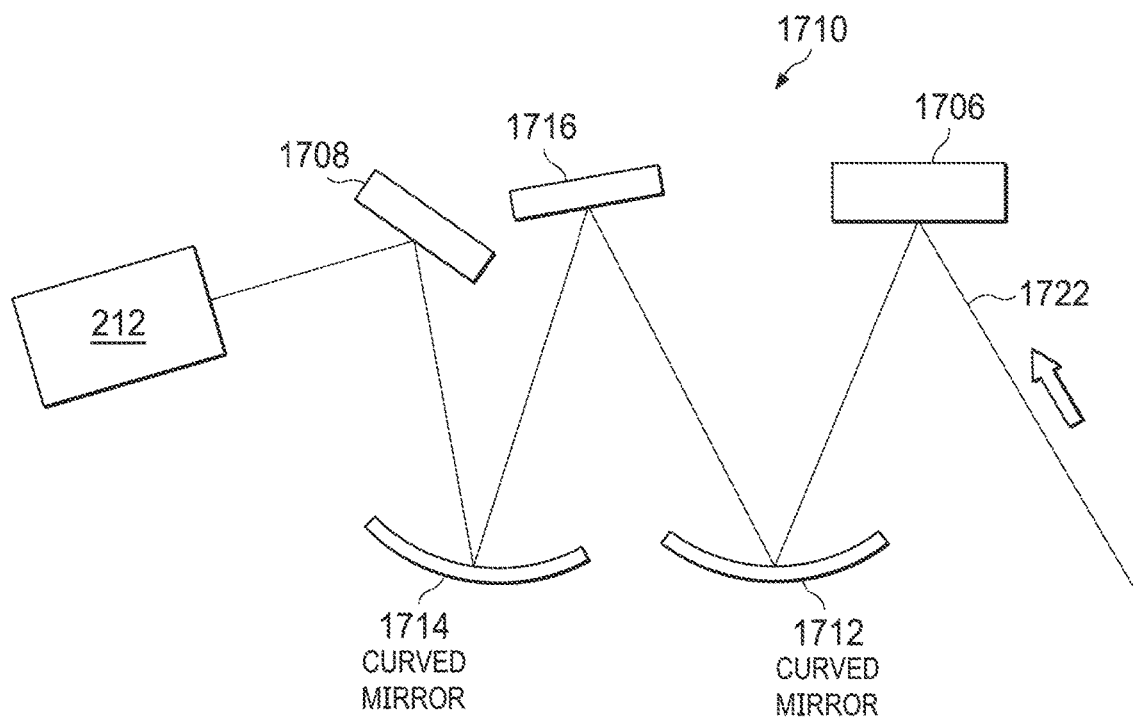
FIG. 17 illustrates an optical scanner having a molded reflective relay, in accordance with some embodiments.

FIG. 17 shows an example of an optical scanner 1704 (which may be considered an embodiment of optical scanner 204 of FIG. 2) that includes a molded reflective relay 1710 as its optical relay (which may be considered an embodiment of optical relay 210 of FIG. 2). The molded reflective relay 1710 includes a first curved mirror 1712, a fold mirror 1716, and a second curved mirror 1714, where the first and second curved mirrors bend and reflect incident light, while the fold mirror only reflects incident light. The first and second curved mirrors and the fold mirror of the molded reflective relay may be formed to enable total internal reflection (TIR) by mirror coating or forming metasurfaces in or on corresponding portions of a molded structure of optically transparent material. In the depicted embodiment, a single input laser light beam 1722 is incident on a first scan mirror 1706 (which may be considered an embodiment of scan mirror 206 of FIG. 2), is then scanned across the first curved mirror 1712 of the molded reflective relay, which reflects and focuses the input laser light beam toward the fold mirror 1716, which reflects the input laser light beam toward the second curved mirror 1714, which reflects and focuses the input laser light beam toward a second scan mirror 1708 (which may be considered an embodiment of the scan mirror 208 of FIG. 2) to subsequently converge to a pupil plane (e.g., at the incoupler 212 of the waveguide 205 of FIG. 2). It should be understood that only the central ray of the laser light scanned by the first scan mirror is shown in the present example for the sake of clarity, but following the first scan mirror the laser light is scanned (e.g., along a single dimension/plane) across each of the first and second curved mirrors 1712 and 1714, the fold mirror 1716, and the second scan mirror 1708 before converging to a pupil plane at the incoupler 212.

Figure 18:
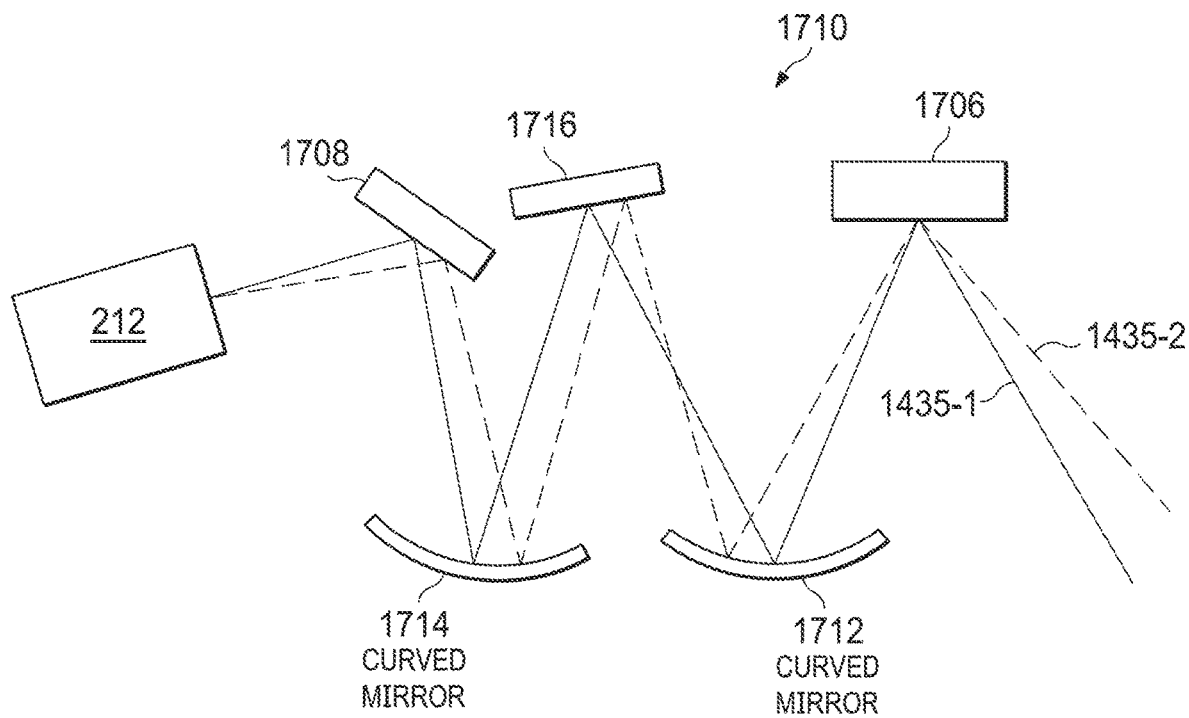
FIG. 18 illustrates an optical scanner having a molded reflective relay, in which first and second angularly separated input laser light beams are incident on the first scan mirror of the optical scanner, in accordance with some embodiments.

FIG. 18 shows an example of the optical scanner of FIG. 17, where first and second angularly separated input laser light beams (e.g., the first combined laser light beam 1435-1 and second combined laser light beam 1435-2 of FIG. 14) are incident on the first scan mirror 1706. As shown, the central rays of the first combined laser light beam 1435-1 and the second combined laser light beam 1435-2 follow different optical paths through the optical relay 1710 after being scanned by the first scan mirror 1706, then each converge to an optical pupil at the incoupler 212 of the waveguide after being scanned by the second scan mirror 1708. As described elsewhere herein, the first and second sets of pixels that are displayed via scanning of the first and second angularly separated input laser light beams (combined laser light beams 1435-1 and 1435-2) by the optical scanner may partially overlap.

Figure 19:
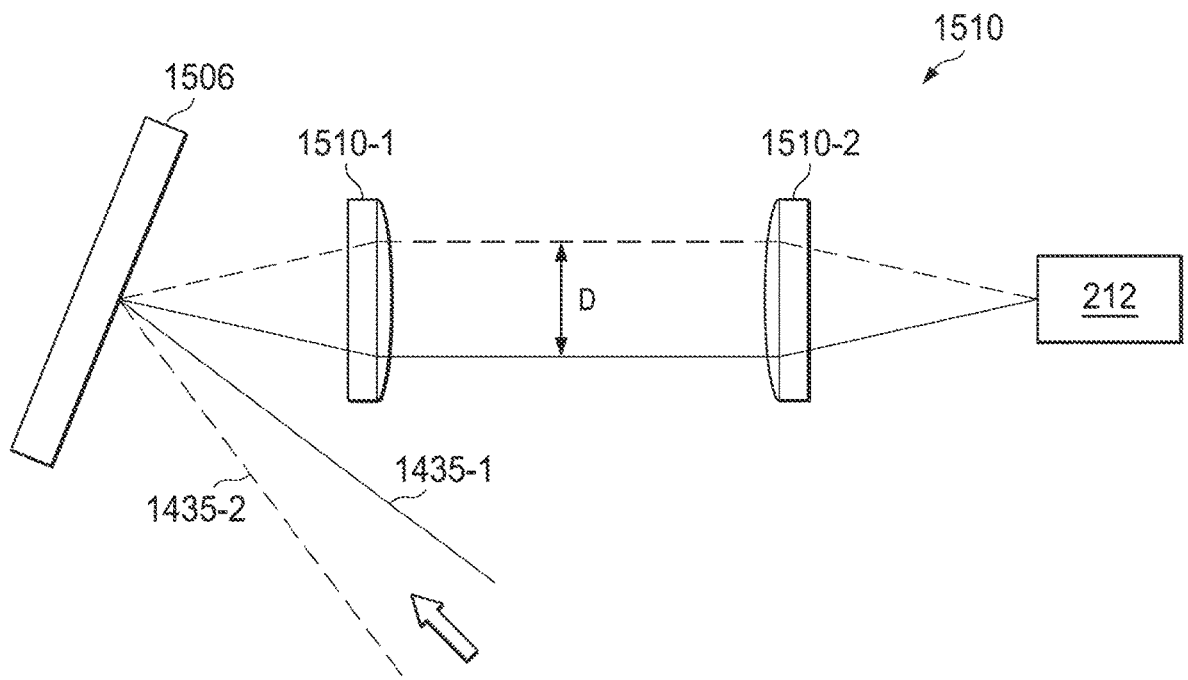
FIG. 19 illustrates a portion of an optical scanner that includes a 4f relay, with first and second angularly separated input laser light beams being scanned across overlapping scan regions, in accordance with some embodiments.

FIG. 19 shows an example of the optical scanner 1510 of FIG. 15, where first and second angularly separated input laser light beams (e.g., the first combined laser light beam 1435-1 and second combined laser light beam 1435-2 of FIG. 14) are incident on the scan mirror 1506, and where the angular separation is relatively small, such that the first and second angularly separated input laser light beams overlap the same FOV, thereby superimposing pixels. As shown, the central ray of the first combined laser light beam 1435-1 is offset by distance D from the central ray of the second combined laser light beam 1435-2 between the first and second lenses 1510-1 and 1510-2 of the optical relay 1510 after each beam is scanned by the first scan mirror 1506, with the distance D being a function of the angular separation of the first and second angularly separated input laser light beams. As shown, the central rays of the first combined laser light beam 1435-1 and second combined laser light beam 1435-2 follow different optical paths through the optical relay after being scanned by the first scan mirror 1506, then each converge to an optical pupil at the incoupler 212 of the waveguide. As described elsewhere herein, the first and second sets of pixels that are displayed via scanning of the first and second angularly separated input laser light beams by the optical scanner 1510 may partially overlap.

Figure 20:
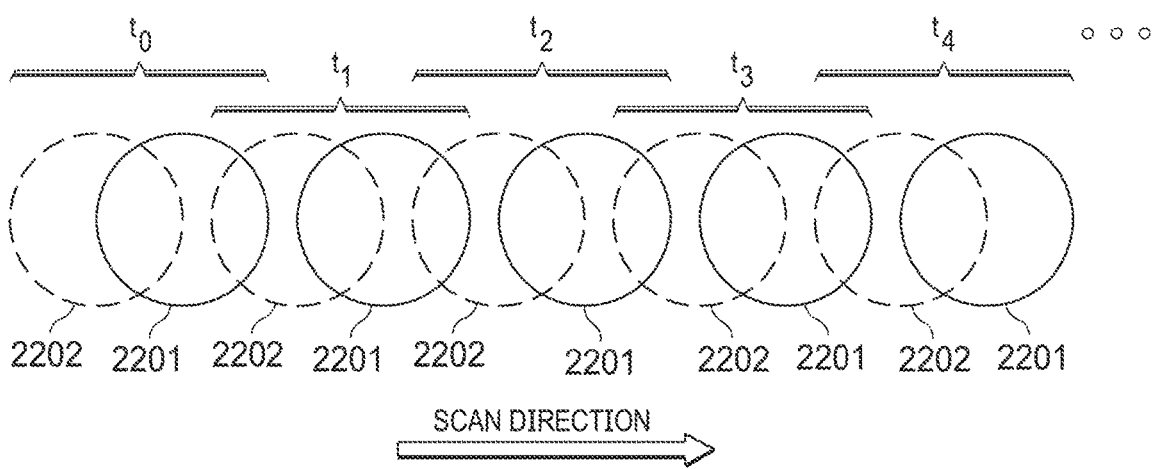
FIG. 20 illustrates a row of pixels that includes a first set of pixels that partially overlaps a second set of pixels, due to angular separation of corresponding input laser light beams, in accordance with some embodiments.

FIG. 20 shows an example row of first and second sets of pixels that are output by an embodiment of a display system (e.g., the laser projection system 200 of FIG. 2) that includes an optical scanner in which the angular separation between the first and second input laser light beams is relatively small. The first set of pixels 2001 corresponds to the first input laser light beam (e.g., first combined laser light beam 1435-1), while the second set of pixels 2002 corresponds to the second input laser light beam (e.g., second combined laser light beam 1435-2). As shown, the first set of pixels 2001 and the second set of pixels 2002 partially overlap one another along a common row. Each pixel in a given one of the first set of pixels 2001 and the second set of pixels 2002 is output by the display system at a different time (e.g., times $t_0$, $t_1$, $t_2$, $t_3$, $t_4$, and so on) with respect to the other pixels within that set. However, pairs of pixels from the first set of pixels and the second set of pixels are displayed at the same time. For example, a first pixel of the first set of pixels and a first pixel of the second set of pixels are both displayed at time $t_1$ and partially overlap one another. This partial overlap results from the angular separation of the first and second laser light beams input to the optical scanner, and the lateral offset between the first and second sets of pixels is dependent on the magnitude of that angular separation.

In contrast, suppose an alternative in which the angular separation between the first and second input laser light beams is relatively large. Assuming that greater angular separation, the first set of pixels 2001 would be laterally offset from the second set of pixels 2002 by a greater amount, such that pixels at either edge of the depicted row of pixels are not overlapped by pixels of the opposing set of pixels. That is, there would be regions at the edge of a given row of pixels that correspond to only one of the first and second input laser light beams.

Figure 21:
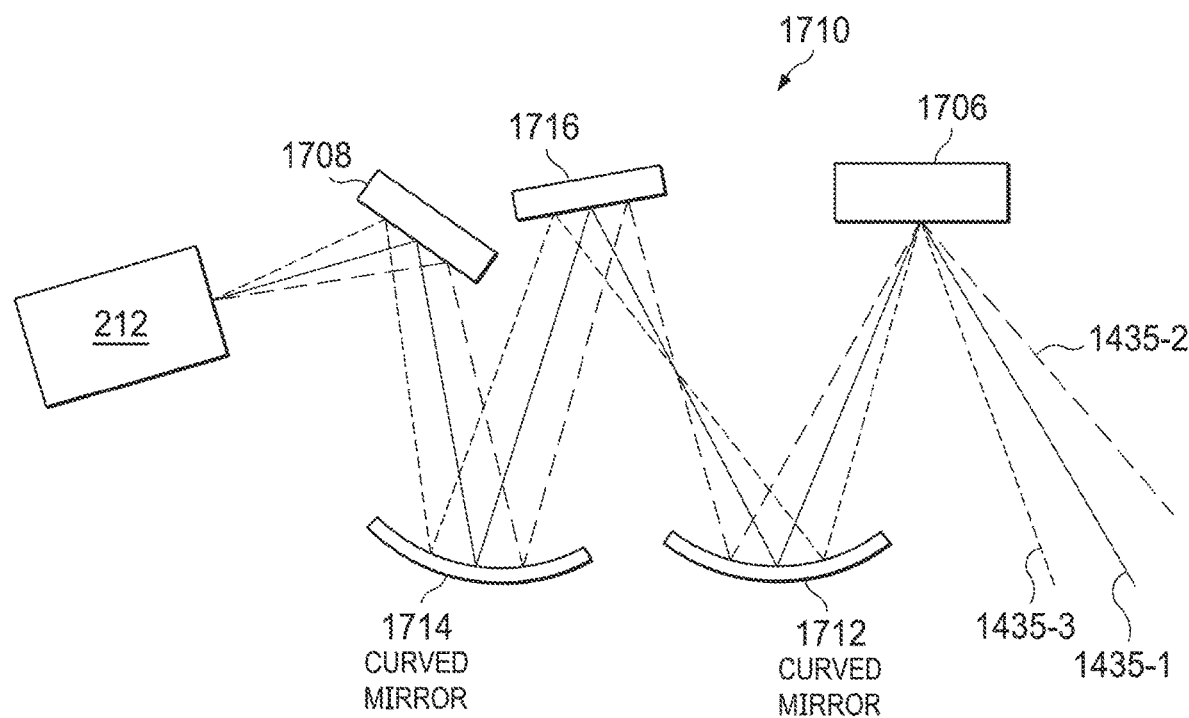
FIG. 21 illustrates an optical scanner having a molded reflective relay, in which first, second, and third angularly separated input laser light beams are incident on the first scan mirror of the optical scanner, in accordance with some embodiments.

In some embodiments, more than two input laser light beams may be received by the optical scanner. FIG. 21 shows an example in which three input laser light beams 1435-1, 1435-2, and 1435-3 are incident on the first scan mirror 1706 of the optical scanner of FIG. 17.

Figure 22:
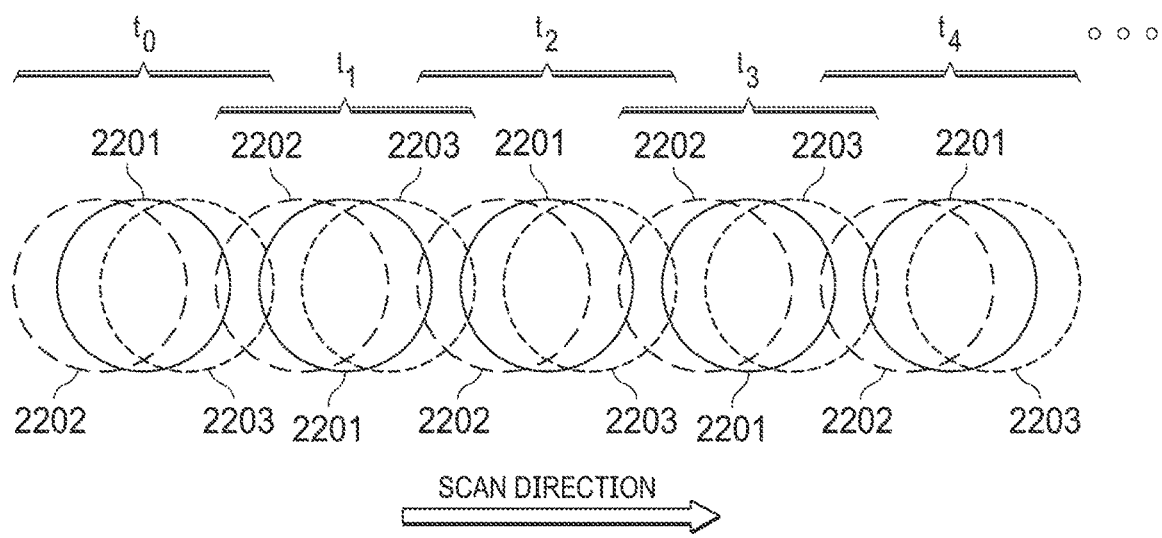
FIG. 22 illustrates a row of pixels that includes first, second, and third sets of pixels that partially overlap one another due to angular separation of corresponding input laser light beams, in accordance with some embodiments.

FIG. 22 shows an example row of first, second, and third sets of pixels, with each set of pixels corresponding to and being provided via a respective one of the three input laser light beams 1435-1, 1435-2, and 1435-3 of FIG. 21. In the present example, each of the first set of pixels 2201, second set of pixels 2202, and third set of pixels 2203 are laterally offset from one another along a horizontal scan direction, but are aligned along the vertical direction such that all of the pixels are positioned in the same row. It will be appreciated that in certain embodiments, one or more input laser light beams may be scanned out of plane with respect to the first and second input laser light beams by the first scan mirror, resulting in configurations in which the corresponding one or more sets of pixels are vertically offset from one another along the horizontal scan direction.

Figure 23:
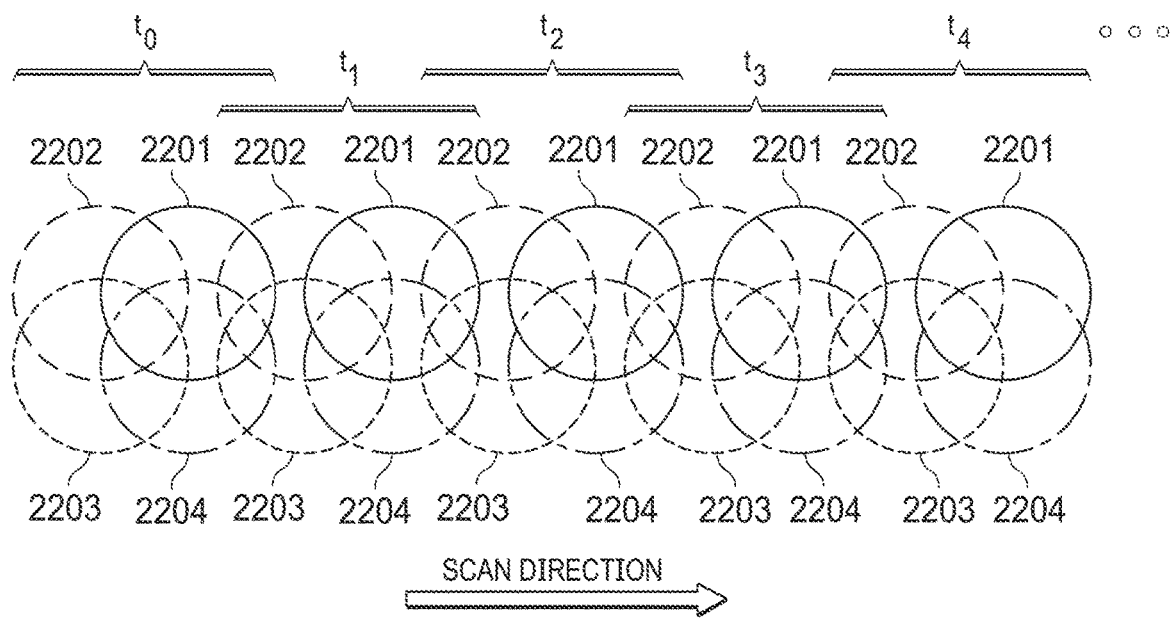
FIG. 23 illustrates a row of pixels that includes first, second, third, and fourth sets of pixels that partially overlap one another due to angular separation of corresponding input laser light beams, with two of the input laser light beams being out of plane with the other two input laser light beams, causing the third and fourth sets of pixels to be vertically offset from the first and second sets of pixels, in accordance with some embodiments.

FIG. 23 shows an example row of first, second, third, and fourth sets of pixels (2201, 2202, 2203, and 2204, respectively) in an embodiment in which four angularly separated input laser light beams are provided to the optical engine, such that each set of pixels corresponds to and is provided via a respective one of the four angularly separated input laser light beams. To achieve the pixel arrangement of FIG. 23, the first and second input laser light beams are scanned in-plane with respect to one another along a first plane by the first scan mirror, while the third and fourth input laser light beams are scanned in-plane with respect to one another along a second plane, such that the first and second input laser light beams are out of plane with respect to the third and fourth input laser light beams.

Figure 24:
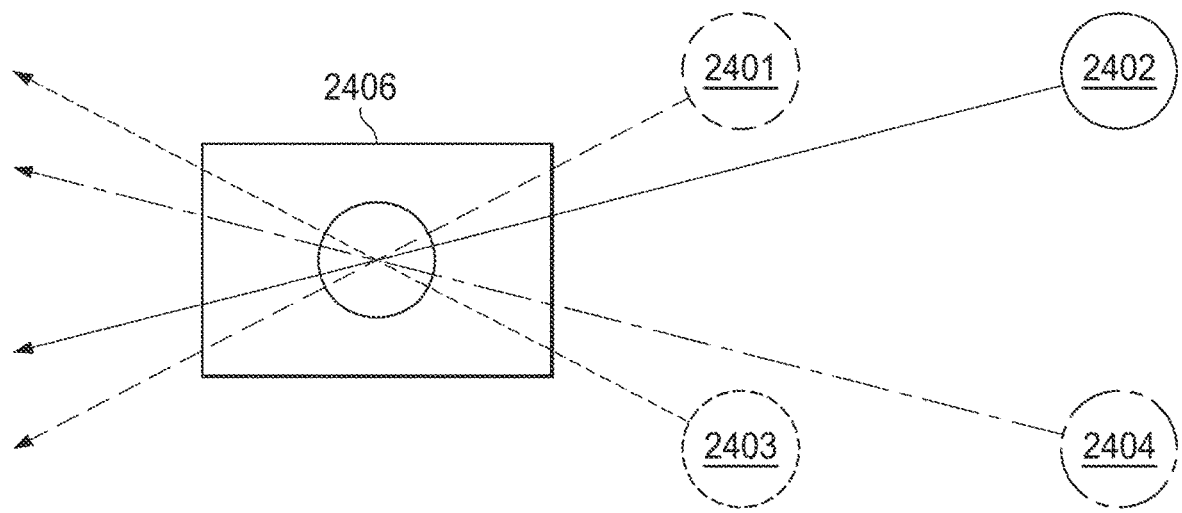
FIG. 24 illustrates four angularly separated input laser light beams that correspond to a 2×2 block of pixels, in accordance with some embodiments.

FIG. 24 shows an example of how first, second, third, and fourth input laser light beams, respectively corresponding to sets of pixels 2201, 2202, 2203, and 2204 of FIG. 23 are incident on a first scan mirror 2406 (which may be considered an embodiment of first scan mirror 1706 of FIGS. 17, 18, and 21). In the present example, the first, second, third, and fourth input laser light beams are angularly separated with respect to one another such that the pixels output by the display system do not overlap.

Figure 25:
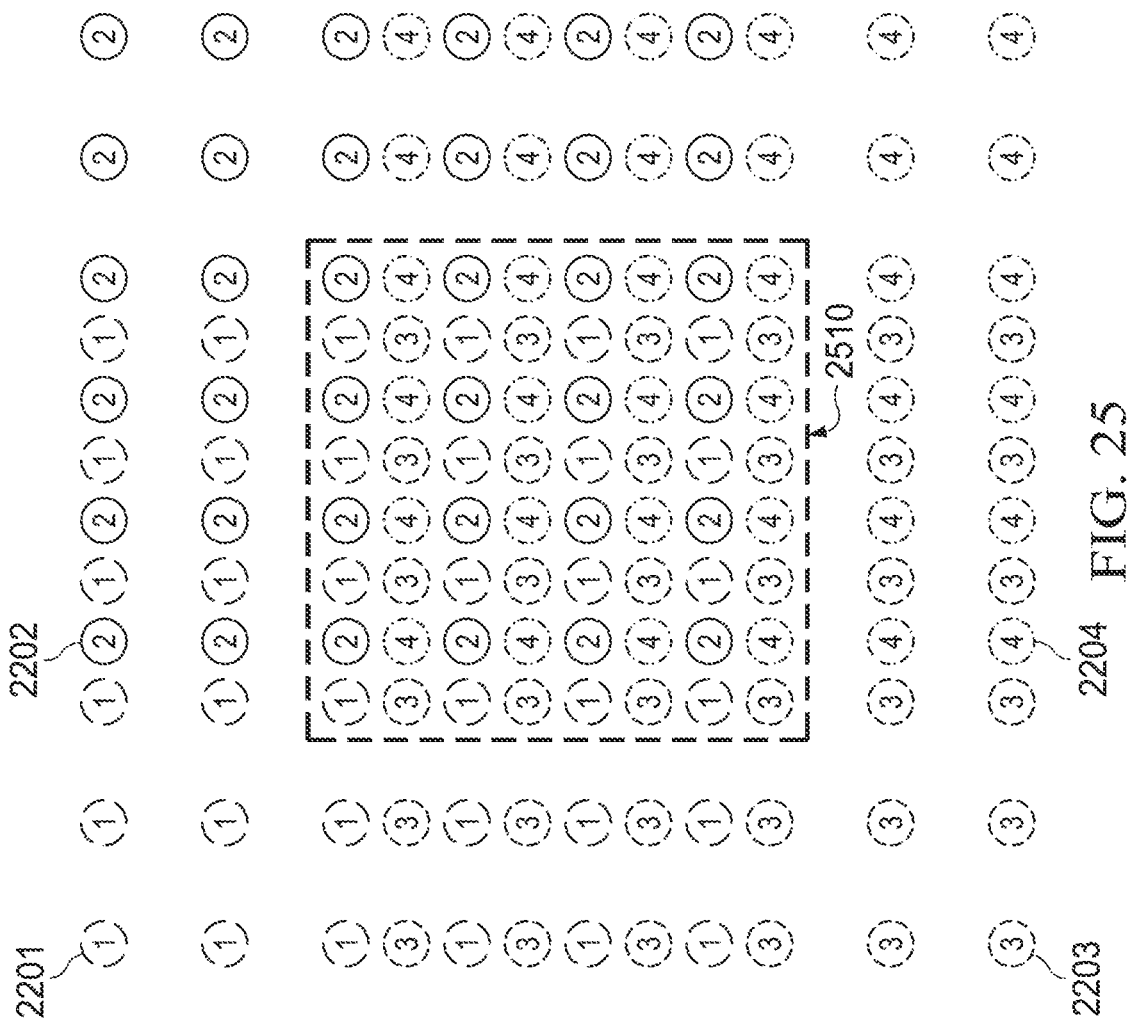
FIG. 25 illustrates the pixels within the field of view of a display system that includes the angularly separated input laser light beams of FIG. 28, in accordance with some embodiments.

An example of an image corresponding to such the arrangement of pixels produced by the input laser light beams of FIG. 24 is shown in the example of FIG. 25, with spacing between pixels being greatly exaggerated for the sake of clarity. In the present example, the first, second, third, and fourth sets of pixels 2201 (which includes all pixels identified as '1'), 2202 (which includes all pixels identified as '2'), 2203 (which includes all pixels identified as '3'), and 2204 (which includes all pixels identified as '1') form an array of pixels that includes rows of pixels from the first and second sets of pixels, rows of pixels from the third and fourth sets of pixels, columns of pixels from the first and third sets of pixels, and columns of pixels from the second and fourth sets of pixels. An array of blocks of pixels is disposed within the illustrated region 2510, with each block of pixels including a pixel from the first set of pixels 2201, a pixel from the second set of pixels 2202, a pixel from the third set of pixels 2203, and a pixel from the fourth set of pixels 2204. Within the region 2510, no two adjacent pixels belong to the same set of pixels, as the pixels within each row and each column within the square alternate between sets of pixels. Due to the horizontal and vertical offsets of the four sets of pixels, certain regions outside of the region 2510 include pixels corresponding to only one or only two of the sets of pixels, rather than including pixels belonging to all four sets of pixels. Additionally, pixel density within the region 2510 is higher than pixel density outside the square. In some embodiments, the display content can be advantageously configured in accordance with this pixel density disparity; in other configurations and embodiments, the perimeter pixels (i.e., those outside of the region 2510) may not be used.

In some embodiments, the spacing between the superimposed pixels of the examples of FIGS. 20, 22, 23, and 25 is equal along both axes, while in other embodiments, the spacing between these superimposed pixels is irregular along one or both axes.

The technique of superimposing pixels generated by angularly separated input laser light beams (sometimes referred to herein as "angular pixel superposition"), as described in connection with FIGS. 18-25 and elsewhere herein, generally increases the number of pixels that can be displayed using a fixed scan speed (e.g., since multiple input laser light beams carrying image data are scanned simultaneously). Angular pixel superposition may be particularly useful in applications with a large FOV and/or otherwise sub optimal pixel density, as the angular pixel superposition technique can increase the pixel density of the display.

As discussed above, in certain embodiments, a given set of laser light sources that is to be combined by a beam combiner may produce laser light of red, green, and blue nominal wavelengths (e.g., RGB with R=~638 nm, G=~520 nm, and B=~465 nm), with each set of laser light sources having relatively low threshold excitation levels. However, in some embodiments, two sets of laser light sources may produce first and second sets of RGB light, each having respectively different wavelengths (e.g., $R_1G_1B_1+R_2G_2B_2$ with $R_1$=~638 nm, $R_2$=~650 nm, $G_1$=~520 nm, $G_2$=~530 nm, $B_1$=~465 nm, and $B_2$=~450 nm). In some embodiments, the wavelengths of the second set of laser light sources may differ from those of the first set of laser light sources significantly, such that the second set of laser light sources is not considered to be RGB (e.g., it may instead by cyan, yellow, maroon; CYM). Embodiments in which the optical engine includes different sets of laser light sources that produce sets of wavelengths of light that are respectively different from one another may increase the display color gamut, reduce laser speckle, and/or reduce interference between the laser light beams produced by the laser light sources.

In some embodiments, a first set of laser light sources may include light sources that produce RGB light, as discussed above, while one or more additional sets of laser light sources produce a different combination of colors. In one example, the first set of laser light sources of the optical engine produces RGB wavelengths of laser light, a second set of laser light sources of the optical engine produces RG wavelengths of laser light, and a third set of laser light sources of the optical engine produces only a G wavelength of laser light. In another example, the first set of laser light sources of the optical engine produces RGGB wavelengths of laser light and a second set of laser light sources of the optical engine produces RR wavelengths of laser light, where the three R wavelengths correspond to respectively different wavelengths of red light, and the two G wavelengths correspond to respectively different wavelengths of green light. For instances in which the availability of laser sources with low threshold excitation levels differs based on the color of each laser light source, the use of a different number of laser light sources in each set of laser light sources of the optical engine may be used to balance the output requirements of the optical engine by color.

In some embodiments, each set of laser light sources of the optical engine may have respectively different brightness levels and/or threshold excitation levels compared to each other set of laser light sources of the optical engine. In some embodiments, the optical engine includes a first set of laser light sources that produce light with relatively high brightness and/or high threshold excitation level and a second set of laser light sources that produce light with relatively low brightness and/or low threshold excitation level, which allows the system to incorporate the benefits of the expanded dynamic range of the second set of laser light sources while still being able to achieve high brightness with the first set of laser light sources and/or to operate in different power usage regimes due to the different threshold excitation levels of each set.

In some embodiments, each set of laser light sources of the optical engine may include sources of a respectively different laser type compared to each other set of laser light sources of the optical engine. For example, a first set of laser light sources of the optical engine may include double heterojunction laser diodes, quantum dot lasers, vertical-cavity surface-emitting lasers (VCSELs), internal cavity lasers, external cavity lasers, or another applicable laser type, while a second set of laser light sources of the optical engine may include sources of one of the aforementioned laser types that are different from the laser type used in the first set of laser light sources.

In some embodiments, the orientation and location of laser light sources and the optical path used to combine laser light beams are not orthogonal and/or are not coplanar.

According to various embodiments, the cross-sectional shape of each laser light beam produced by the optical engine may be circular, elliptical, or another applicable shape.

While the examples of FIG. 16 generally relates to expanding the FOV of the display system by scanning different angularly separated input combined laser light beams in two different scan regions, and the examples of FIGS. 17-25 generally relate to superimposing pixels by scanning different angularly separated input combined laser light beams in substantially overlapping scan regions, it should be understood that in some embodiments, the use of multiple angularly separated laser sets in the optical engine may both expand the FOV and superimpose pixels in the same display system.

As discussed elsewhere herein (such as with respect to the examples of FIGS. 10-14), another technique for combining multiple sets of laser light beams output by multiple sets of laser light sources involves placing multiple laser dies on each of one or more submounts of the optical engine, such as to produce parallel combined laser light beams (via the combining of the laser light beams by dichroic beam splitters of a beam combiner). In certain embodiments, each submount may include multiple laser dies having an elliptical or other noncircular cross-sectional shape, such as to advantageously decrease an acceptable minimum distance between two or more laser dies positioned on the same submount.

Figure 26:
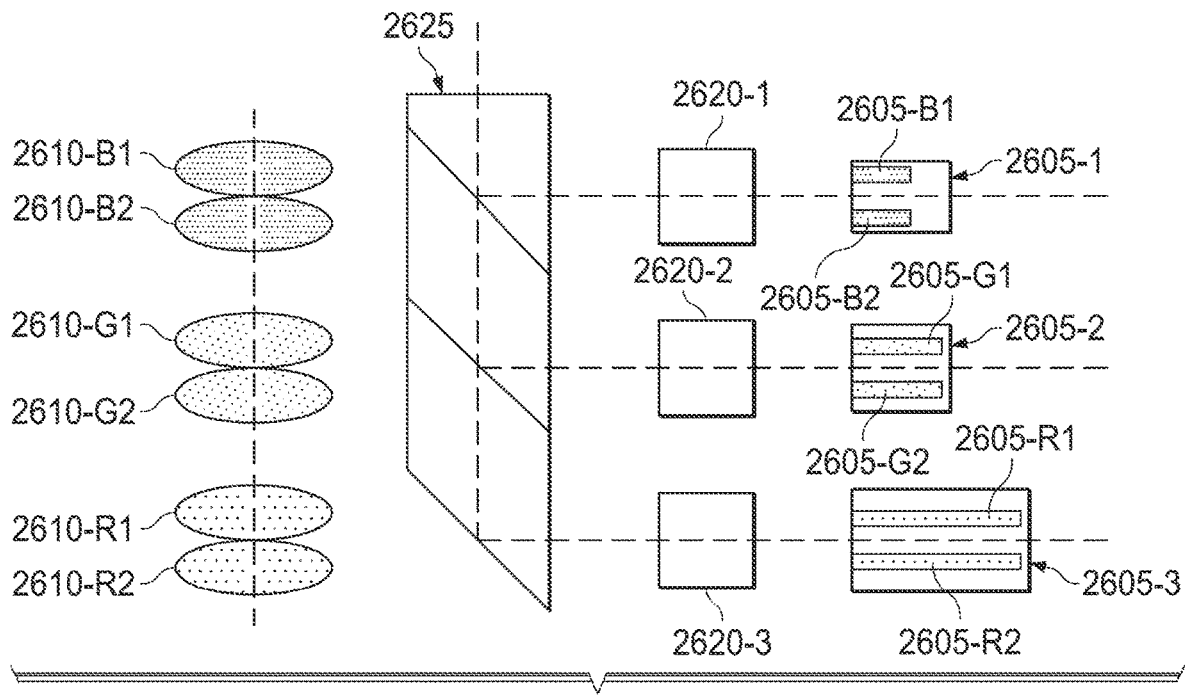
FIG. 26 illustrates a portion of a display system having an optical engine that includes red, green, and blue laser light sources, with each submount of the optical engine including only a respective pair of laser die, in accordance with some embodiments.

FIG. 26 shows an example of an optical engine (e.g., the optical engine 202 of FIG. 2) having six distinct laser light sources collectively referenced herein as laser emitters 2605: a first laser light source that includes a first submount 2605-1, on which first and second blue laser dies 2605-B1 and 2605-B2 are disposed; a second laser light source that includes a second submount 2605-2, on which first and second green laser dies 2605-G1 and 2605-G2 are disposed, and a third laser light source that includes a third submount on which first and second red laser dies are disposed. Laser light beams output by the six laser dies pass through respective collimating lenses 2620-1, 2620-2, and 2620-3 (which may be considered embodiments of primary lenses 406 of FIG. 4), which focus the laser light beams onto dichroic beam splitters of the beam combiner 2625 placed at the output of the collimating lenses.

As depicted with respect to elliptical laser beam profiles 2610-B1, 2610-B2, 2610-G1, 2610-G2, 2610-R1, and 2610-R2, in the depicted embodiment the laser light beams produced via laser emitters 2605 each have an elliptical cross-sectional shape. In addition, in certain embodiments one or more of the collimating lenses 2620-1, 2620-2, and 2620-3 may comprise a discrete, edge-trimmed lens, shaped to have an aperture that approximates the cross-sectional shape (a non-circular elliptical shape, in the present example) of the laser light beam output by one or more corresponding laser dies of the optical engine. By shaping the collimating lens to approximate the shape of the laser light beam that is to be passed through the collimating lens, the laser dies on a given submount may be positioned closer together. The depicted embodiment produces combined laser light beams that are parallel, following combining of the laser light beams by the dichroic beam splitters of the beam combiner 2625.

In some embodiments, the collimating lenses at the output of the optical engine may each include an array of lenses. For example, in the embodiment of FIG. 26, each of the collimating lenses 2620-1, 2620-2, and 2620-3 may be implemented as respective 2×1 arrays of collimating lenses that may be disposed between each submount 2605-1, 2605-2, and 2605-3 of the optical engine and the beam combiner 2625. In this manner, each laser light beam output by each of the laser emitters 2605 passes through a respectively different lens of the 2×1 arrays of collimating lenses. In other embodiments, the collimating lenses at the output of the optical engine may include a single lens per pair of laser dies (i.e., with each pair of laser dies being disposed on a respective common submount).

Figure 27:
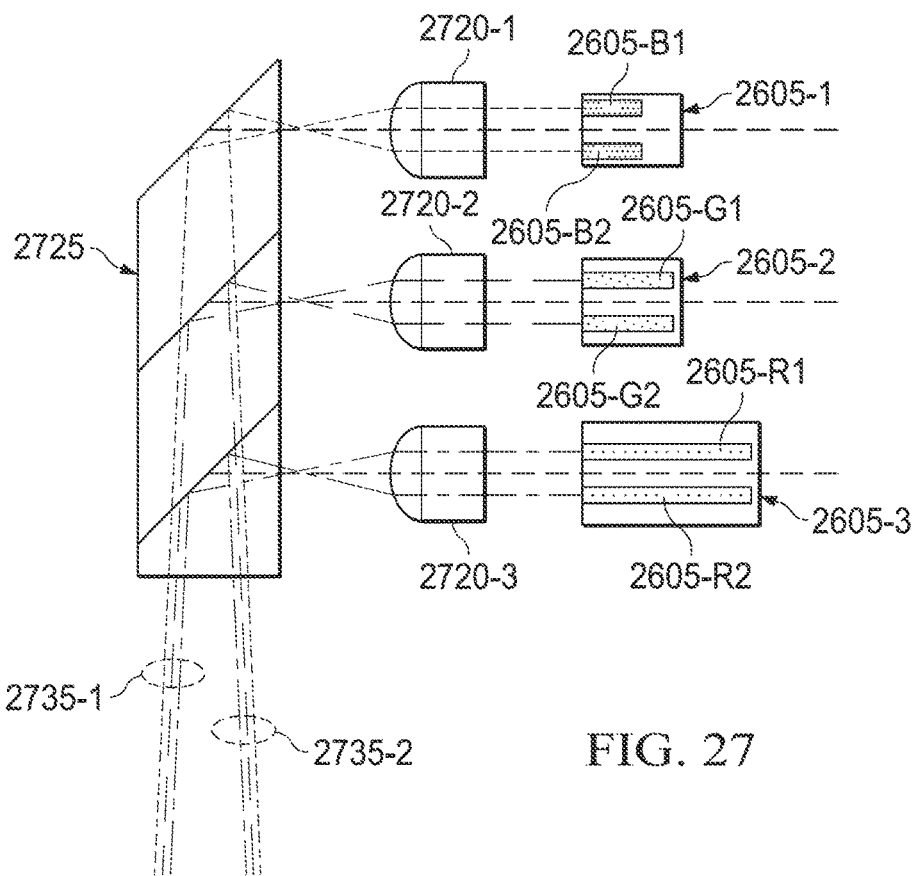
FIG. 27 illustrates a portion of a display system having an optical engine that includes red, green, and blue laser light sources, with each submount of the optical engine including only a respective pair of laser die, and with a respective collimating lens being included between the optical engine and the beam combiner for each pair of laser die, in accordance with some embodiments.

FIG. 27 shows an example in which respective single collimating lenses 2720-1, 2720-2, and 2720-3 are disposed between each submount 2605-1, 2605-2, and 2605-3 and a beam combiner 2725, such that each pair of laser light beams output by each commonly mounted pair of laser dies passes through a different single collimating lens. In the depicted embodiment, the output laser light beam generated by each laser die of a given commonly mounted pair of laser dies is symmetrically de-centered from the output laser light beam generated by the other laser die in the pair, such that the two output laser light beams do not pass symmetrically about the center of the collimating lens. This symmetric decentering of the laser light beams output by the laser dies of each commonly mounted pair of laser dies causes the beam combiner 2725 to produce two combined laser light beams 2735-1 and 2735-2 that are angularly separated from one another.

In some embodiments, the die spacing and/or path length from one or more of the collimating lenses to the beam combiner may be adjusted with respect to each pair of commonly mounted laser die, such as to better align the laser light beams output by laser die of different pairs.

Figure 28:
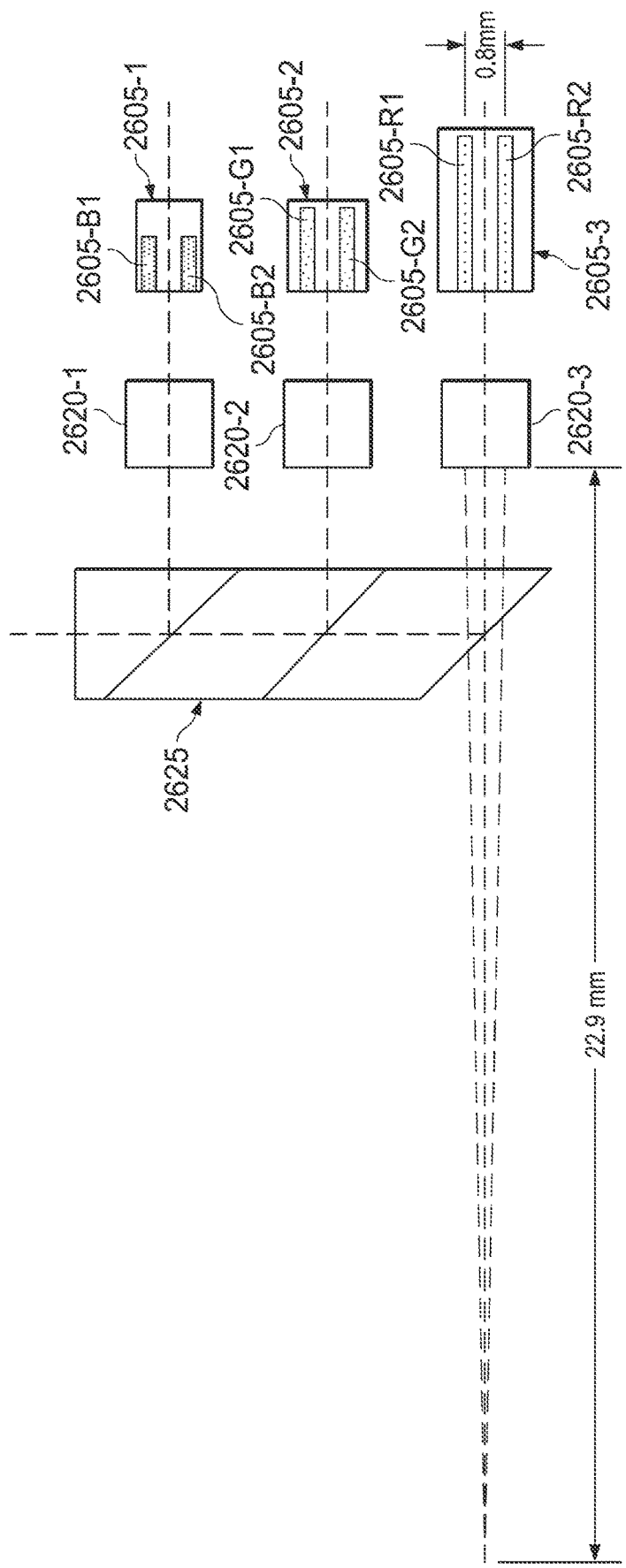
FIG. 28 illustrates the relationship between angular separation, path length, and spacing between commonly mounted laser die pairs, in accordance with some embodiments.

FIG. 28 shows an example embodiment of either of the systems of FIGS. 26 and 27, in which each laser die of each commonly mounted pair (e.g., laser dies 2605-R1 and 2605-R2) are spaced about 0.8 mm apart from the other die in its pair, and the angular separation of the laser light beams output by each pair is about 2 degrees (e.g., 1 degree from a central axis between the two laser dies of the pair and each of the two laser light beams), requiring an optical path length of about 22.9 mm for the two laser light beams output by a given pair of laser die to intersect. In some embodiments, in order to handle such a long path length, one or more path adjustment measures (e.g., a retroreflector prism or other appropriate measure) may be included at the beam combiner 2625. Due to differences between a refractive index associated with the material of such a prism (e.g., glass) and that associated with air, such adjustment measures may in certain embodiments alter the path length and/or angular separation of the laser light beams output by each commonly mounted pair of laser die when passing through that material. For example, when passing through the glass of a retroreflector comprised of N-BK7 glass (which has a refractive index of about 1.517), the angle of separation between the laser light beams becomes 1.32 degrees (e.g., 0.66 degrees from a central axis between the two laser dies of the pair and between the two laser light beams), resulting in a path length of 34.7 mm.

In various embodiments, various types of reflectively different retroreflector prisms may be disposed at, and/or included in, the beam combiner in order to accommodate relatively long path lengths for the angularly separated laser light beams output by pairs of commonly mounted laser dies of the optical engine (e.g., to accommodate the path length shown in FIG. 37). Such accommodation is utilized in order to ensure that each pair of angularly separated laser light beams intersects at the reflective surface of the first scan mirror.

Figure 29:
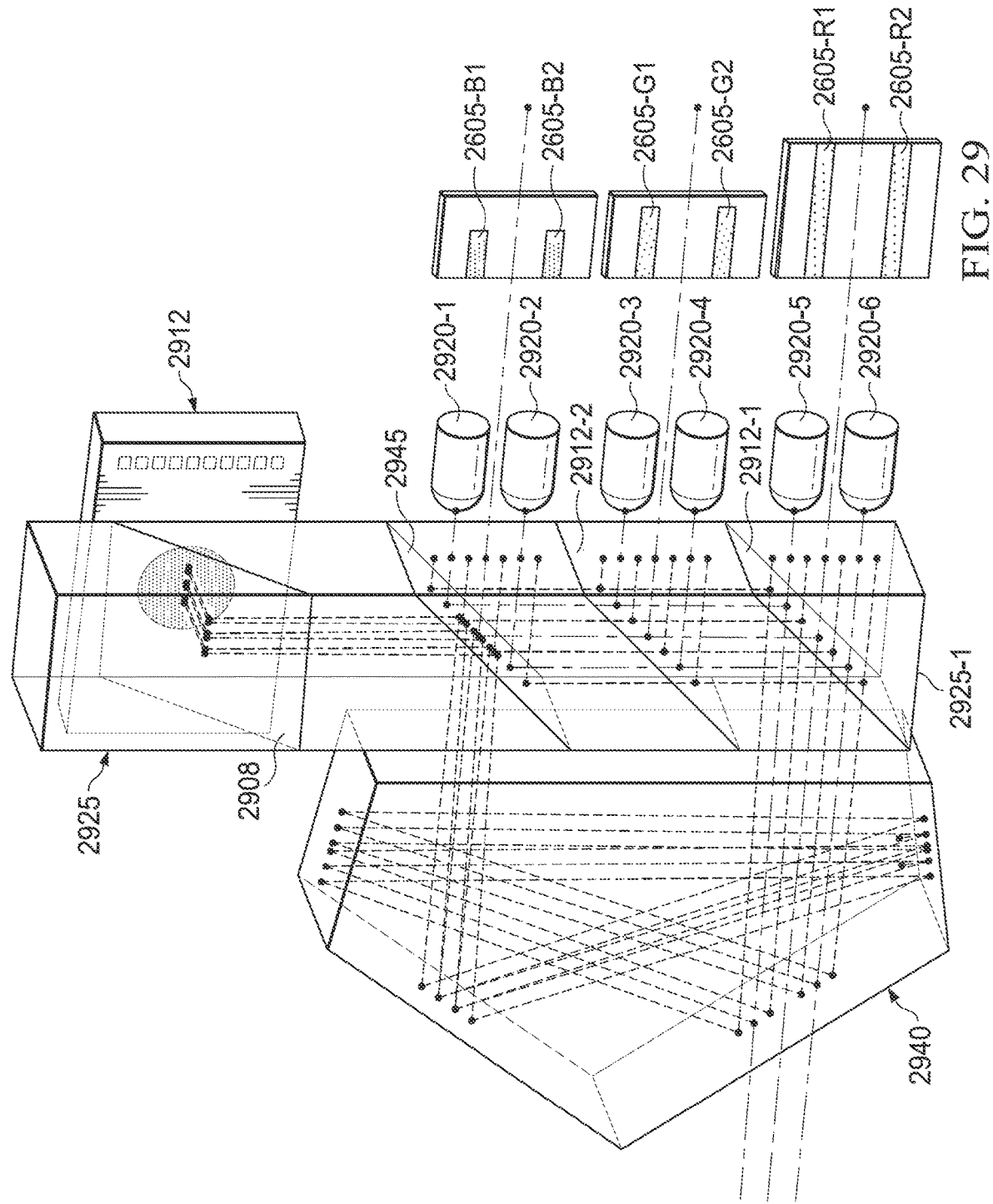
FIG. 29 illustrates a retroreflector prism disposed at a beam combiner of a display system, where angularly separated laser light beams passing through the retroreflector prism intersect at the reflective surface of a scan mirror, in accordance with some embodiments.

FIG. 29 shows an example embodiment in which a retroreflector prism 2940 is disposed on an opposite side of a beam combiner 2925 from a set of collimating lenses 2920 that includes individual collimating lenses 2920-1, 2920-2, 2920-3, 2920-4, 2920-5, and 2920-6, each of which receives laser light from laser dies 2605-B1, 2605-B2, 2605-G1, 2605-G2, 2605-R1, and 2605-R2, respectively. As shown, rather than including a dichroic beam splitter in the path of laser die 2920-1 (providing the laser light beam closest to the output of the beam combiner 2925), a mirror 2945 is disposed there, which reflects incoming laser light beams toward a first end 2925-1 of the beam combiner 2925. The dichroic beam splitter 2912-1 directs laser light beams into the retroreflector prism 2940, which outputs the received light beams onto the mirror 2945, which reflects the laser light beams out of the primary output of the beam combiner 2925 via the scanning mirror 2908 to the waveguide incoupler 2912. In some embodiments, the size of the retroreflector prism 2940 is matched to components of the beam combiner 2925, such that the input to the retroreflector prism 2940 is aligned with the output of the dichroic beam splitter 2912-1 and the output of the retroreflector prism is aligned with the mirror 2945. In some embodiments, the retroreflector prism 2940 accommodates long path lengths of the laser light beams received from the laser dies 2605, such that a first set of laser light beams intersect at a first location at the reflective surface of the first scan mirror to form a first combined laser light beam, and a second set of laser light beams intersect at a second location at the reflective surface of the first scan mirror to form a second combined laser light beam. While the retroreflector prism 2940 of FIG. 29 is shown in the present example, it should be understood that various other configurations of retroreflector prism may be utilized and disposed at an equivalent location with respect to the beam combiner in some embodiments.

Figure 30:
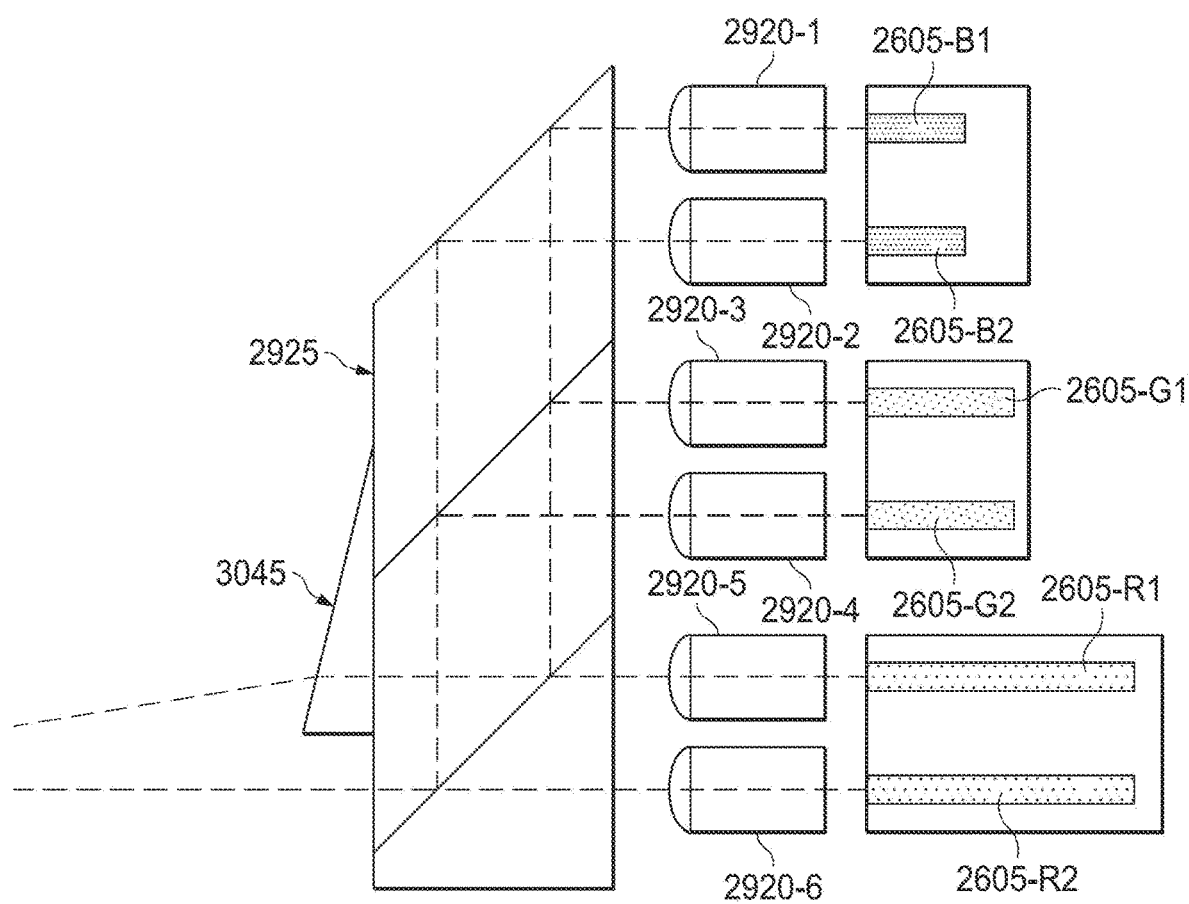
FIG. 30 illustrates a wedge prism disposed on a beam combiner, where the wedge prism introduces or changes angular separation between laser light beams output by the beam combiner, in accordance with some embodiments.

In some embodiments, the angular separation between the laser light beams of each given pair of laser light beams output by the optical engine is too large or too small (possibly such that a given pair are substantially parallel) upon exiting the beam combiner prior to passing through the retroreflector prism. FIG. 30 shows an example of a wedge prism 3045 that may be mounted on the beam combiner 2925 to adjust the angular separation between the laser light beams of each pair of laser light beams output by the beam combiner toward the retroreflector prism 2940 (not shown in the present example). In certain embodiments, one or more reflective surfaces within the retroreflector prism 2940 may provide or modify the angular separation between the laser light beams of each pair of laser light beams received by the retroreflector prism.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A display system comprising:
    an optical engine comprising a plurality of laser light sources;
    a beam combiner configured to:
        combine a first subset of a plurality of laser light beams output by the plurality of laser light sources into a first combined laser light beam; and
        combine a second subset of the plurality of laser light beams into a second combined laser light beam that is different from the first combined laser light beam; and
    an optical scanner configured to form a first set of pixels using the first combined laser light beam and to form a second set of pixels using the second combined laser light beam, wherein the first set of pixels at least partially overlaps the second set of pixels within a field of view of the display system.

2. The display system of claim 1, wherein the beam combiner comprises a plurality of dichroic beam splitters that each receive one or more laser light beams of the plurality of laser light beams.

3. The display system of claim 2, wherein the plurality of dichroic beam splitters is arranged within the beam combiner in an ascending order with respect to a wavelength of light respectively associated with each of the plurality of dichroic beam splitters.

4. The display system of claim 1, wherein the beam combiner comprises at least one polarization beam splitter configured to combine a first subset of the plurality of laser light beams having a first polarization with a second subset of the plurality of laser light beams having a second polarization.

5. The display system of claim 1, wherein the beam combiner comprises a first set of dichroic beam splitters to combine the first subset of laser light beams and comprises a second set of dichroic beam splitters to combine the second subset of laser light beams.

6. The display system of claim 1, wherein the first combined laser light beam is angularly separated from the second combined laser light beam.

7. The display system of claim 1, further comprising a waveguide, wherein the optical scanner is configured to receive the first combined laser light beam and the second combined laser light beam and to scan the first combined laser light beam and the second combined laser light beam along an incoupler of the waveguide, and wherein the waveguide is configured to project the first combined laser light beam and the second combined laser light beam to form the respective first and second sets of pixels.

8. The display system of claim 1, wherein a first region of the field of view includes only pixels of the first set of pixels, and a second region of the field of view includes only pixels of the second set of pixels.

9. The display system of claim 8, wherein a third region of the field of view includes pixels of the first set of pixels superimposed with at least some of the second set of pixels.

10. A display system comprising:
an optical engine comprising a plurality of laser light sources;
a beam combiner configured to combine a plurality of laser light beams output by the plurality of laser light sources;
a plurality of collimating lenses that are disposed between the optical engine and the beam combiner, and that are configured to angularly separate pairs of laser light beams of the plurality of laser light beams; and
a retroreflector prism disposed at a first side of the beam combiner, wherein the optical engine and the collimating lenses are disposed at a second side of the beam combiner that is opposite the first side, wherein the retroreflector prism is configured to provide an extended optical path length to one or more laser light beams of the plurality of laser light beams.

11. The display system of claim 10, further comprising:
a wedge prism coupled to the beam combiner to adjust an angular separation between the laser light beams of each pair of laser light beams output by the beam combiner toward the retroreflector prism.

12. A beam combiner operable to be optically coupled to a plurality of laser light sources, the beam combiner comprising:
a plurality of dichroic beam splitters configured to combine a first subset of the plurality of laser light beams into a first combined laser light beam, and to combine a second subset of the plurality of laser light beams into a second combined laser light beam that is distinct and separate from the first combined laser light beam; and
a retroreflector prism configured to provide an extended optical path length to one or more laser light beams of the plurality of laser light beams.

13. The beam combiner of claim 12, wherein the plurality of dichroic beam splitters is arranged within the beam combiner in an ascending order with respect to a wavelength of light respectively associated with each of the plurality of dichroic beam splitters.

14. The beam combiner of claim 12, further comprising at least one polarization beam splitter configured to combine a first subset of the plurality of laser light beams having a first polarization with a second subset of the plurality of laser light beams having a second polarization.

15. The beam combiner of claim 12, wherein the beam combiner comprises a first set of dichroic beam splitters to combine the first subset of laser light beams, and comprises a second set of dichroic beam splitters to combine the second subset of laser light beams.

16. The beam combiner of claim 12, wherein the first combined laser light beam is angularly separated with respect to the second laser light beam.

17. The beam combiner of claim 12, further comprising:
a wedge prism configured to adjust an angular separation between the laser light beams of each of multiple pairs of laser light beams output by the beam combiner toward the retroreflector prism.

18. A method, comprising:
combining a first subset of a plurality of laser light beams into a first combined laser light beam;
combining a second subset of the plurality of laser light beams into a second combined laser light beam that is angularly separated from the first combined laser light beam; and
based at least in part on an angular separation of the first combined laser light beam and the second combined laser light beam, scanning the first combined laser light beam and the second combined laser light beam across an incoupler of a waveguide to form respective first and second sets of pixels, the first set of pixels at least partially overlapping the second set of pixels.

19. The display system of claim 18, wherein a first region of the field of view includes only pixels of the first set of pixels, and a second region of the field of view includes only pixels of the second set of pixels.

20. The display system of claim 19, wherein a third region of the field of view includes pixels of the first set of pixels superimposed with at least some of the second set of pixels.

* * * * *